(12) United States Patent
Brown

(10) Patent No.: US 10,198,741 B2
(45) Date of Patent: Feb. 5, 2019

(54) METHOD AND APPARATUS FOR CONTENT PRESENTATION IN ASSOCIATION WITH A COMMUNICATION CONNECTION

(71) Applicant: Wendell D. Brown, Henderson, NV (US)

(72) Inventor: Wendell D. Brown, Henderson, NV (US)

(73) Assignee: Wendell D. Brown, Henderson, NV (US)

( * ) Notice: Subject to any disclaimer, the term of this patent is extended or adjusted under 35 U.S.C. 154(b) by 0 days.

(21) Appl. No.: 15/089,098

(22) Filed: Apr. 1, 2016

(65) Prior Publication Data

US 2016/0219142 A1 Jul. 28, 2016

Related U.S. Application Data

(63) Continuation-in-part of application No. 14/951,351, filed on Nov. 24, 2015, now Pat. No. 9,578,474.
(Continued)

(51) Int. Cl.
*G06Q 30/02* (2012.01)
*H04M 15/00* (2006.01)
(Continued)

(52) U.S. Cl.
CPC .... *G06Q 30/0241* (2013.01); *H04M 3/42042* (2013.01); *H04M 3/42093* (2013.01);
(Continued)

(58) Field of Classification Search
CPC .. H04M 3/42042; H04M 7/006; H04M 15/00; H04M 15/57; H04M 15/63; H04M 15/8292; H04M 2203/1091; H04M 2215/208; H04M 3/42314; H04M 3/42068; H04M 3/42102; H04M 7/0075; H04M 7/009; H04M 3/5191; H04M 3/5237; H04M 2203/551
(Continued)

(56) References Cited

U.S. PATENT DOCUMENTS 5,765,108 A * 6/1998 Martin ................. H04W 8/186
455/422.1
5,923,745 A * 7/1999 Hurd ..................... H04M 3/523
379/220.01
(Continued)

*Primary Examiner* — Akelaw Teshale
(74) *Attorney, Agent, or Firm* — Park, Vaughan, Fleming & Dowler LLP

(57) ABSTRACT

A method and apparatus are provided for presenting content to a caller and/or a called party in association with a telephone call or other communication connection. Content may be presented pre-ring (before the called party's telephone rings), in-call, and/or post-call, and may be related to a party participating in the call or may be related to a third party. Presentation of specified content may include assisted sharing, wherein both parties view the same content and one guides or assists the other. A received call may be split into signal and voice channels, with the signal channel used to notify a call controller of the call and the voice channel being directed to an agent selected by the call controller to handle the call.

23 Claims, 15 Drawing Sheets

Related U.S. Application Data which is a continuation-in-part of application No. 14/327,325, filed on Jul. 9, 2014, now Pat. No. 9,270,820, which is a continuation of application No. 14/041,879, filed on Sep. 30, 2013, now Pat. No. 8,804,930, which is a continuation of application No. 12/563,112, filed on Sep. 18, 2009, now Pat. No. 8,577,000.

(60) Provisional application No. 61/167,105, filed on Apr. 6, 2009.

(51) Int. Cl.

| | | |
|---|---|---|
| *H04W 4/12* | (2009.01) | |
| *H04W 4/16* | (2009.01) | |
| *H04W 4/18* | (2009.01) | |
| *H04W 4/20* | (2018.01) | |
| *H04W 68/00* | (2009.01) | |
| *H04M 3/42* | (2006.01) | |
| *H04M 1/56* | (2006.01) | |
| *H04M 1/57* | (2006.01) | |
| *H04M 7/00* | (2006.01) | |
| *H04M 3/02* | (2006.01) | |
| *H04M 3/436* | (2006.01) | |
| *H04W 4/02* | (2018.01) | |
| *H04W 4/21* | (2018.01) | |

(52) U.S. Cl.
CPC ......... *H04M 7/0027* (2013.01); *H04M 15/61* (2013.01); *H04M 15/8083* (2013.01); *H04M 15/8351* (2013.01); *H04W 4/12* (2013.01); *H04W 4/16* (2013.01); *H04W 4/18* (2013.01); *H04W 4/20* (2013.01); *H04W 68/005* (2013.01); *H04M 1/56* (2013.01); *H04M 1/575* (2013.01); *H04M 3/02* (2013.01); *H04M 3/436* (2013.01); *H04M 7/0036* (2013.01); *H04M 15/83* (2013.01); *H04M 15/848* (2013.01); *H04M 15/85* (2013.01); *H04M 2201/14* (2013.01); *H04M 2203/351* (2013.01); *H04M 2203/352* (2013.01); *H04W 4/02* (2013.01); *H04W 4/21* (2018.02)

(58) Field of Classification Search
USPC .............. 379/207.02, 88.19, 210.01, 265.02, 379/142.07, 207.03, 209.01, 229, 133, 379/142.01, 207.16, 217.01, 219, 221.02, 379/265.01, 265.05, 265.07, 265.12, 379/266.03, 266.08, 37, 424, 428.01, 379/88.04, 88.17, 114.13
See application file for complete search history.

(56) References Cited

U.S. PATENT DOCUMENTS

| | | | |
|---|---|---|---|
| 6,084,628 A | 7/2000 | Sawyer | |
| 6,271,950 B1 | 8/2001 | Hansen et al. | |
| 6,301,342 B1 | 10/2001 | Ander | |
| 6,459,788 B1 * | 10/2002 | Khuc | H04M 3/51 |
| | | | 370/352 |
| 6,493,437 B1 | 12/2002 | Olshansky | |
| 6,497,531 B2 | 12/2002 | Sipherd et al. | |
| 6,553,115 B1 | 4/2003 | Mashinsky | |
| 6,621,899 B2 | 9/2003 | Dezonno et al. | |
| 6,728,353 B1 | 4/2004 | Espejo et al. | |
| 6,856,673 B1 | 2/2005 | Banks | |
| 6,947,531 B1 | 9/2005 | Lewis | |
| 6,977,993 B2 * | 12/2005 | Starbuck | H04M 1/2478 |
| | | | 379/88.21 |
| 7,120,235 B2 | 10/2006 | Altberg et al. | |
| 7,450,704 B2 * | 11/2008 | Lund | H04M 1/247 |
| | | | 379/201.02 |
| 7,486,785 B2 * | 2/2009 | Flores | H04M 3/38 |
| | | | 379/265.01 |
| 7,991,894 B2 | 8/2011 | Koskelainen | |
| 8,073,118 B2 * | 12/2011 | Sterman | G06Q 30/02 |
| | | | 370/352 |
| 8,081,751 B1 | 12/2011 | Martin et al. | |
| 8,086,488 B2 | 12/2011 | Liu | |
| 8,107,600 B1 * | 1/2012 | O'Keeffe | G06Q 30/02 |
| | | | 379/88.22 |
| 8,234,167 B2 | 7/2012 | Civanlar et al. | |
| 8,320,878 B2 * | 11/2012 | Vakil | G06Q 20/14 |
| | | | 379/114.03 |
| 8,639,214 B1 | 1/2014 | Fujisaki | |
| 2004/0196868 A1 | 10/2004 | King | |
| 2005/0278207 A1 * | 12/2005 | Ronnewinkel | G06Q 30/02 |
| | | | 705/326 |
| 2007/0030338 A1 | 2/2007 | Jiang | |
| 2007/0118592 A1 | 5/2007 | Bachenberg | |
| 2007/0140446 A1 | 6/2007 | Haldeman | |
| 2007/0162296 A1 | 7/2007 | Altberg et al. | |
| 2008/0221985 A1 | 9/2008 | Civanlar | |
| 2009/0086950 A1 * | 4/2009 | Vendrow | H04M 3/493 |
| | | | 379/202.01 |
| 2014/0321629 A1 | 10/2014 | Brown | |

* cited by examiner

METHOD AND APPARATUS FOR CONTENT PRESENTATION IN ASSOCIATION WITH A COMMUNICATION CONNECTION

RELATED APPLICATIONS

This application is a continuation-in-part of U.S. patent application Ser. No. 14/951,351, filed Nov. 24, 2015 (the '351 application). The '351 application is a continuation-in-part of U.S. patent application Ser. No. 14/327,325, filed Jul. 9, 2014 and issued Feb. 23, 2016 as U.S. Pat. No. 9,270,820 (the '325 application). The '325 application is a continuation of U.S. patent application Ser. No. 14/041,879, filed Sep. 30, 2013 and issued Aug. 12, 2014 as U.S. Pat. No. 8,804,930 (the '879 application). The '879 application is a continuation of U.S. patent application Ser. No. 12/563,112, filed Sep. 18, 2009 and issued Nov. 5, 2013 as U.S. Pat. No. 8,577,000 (the '112 application). The '112 application claims priority to U.S. Provisional Application No. 61/167,105, filed Apr. 6, 2009. The preceding patents, patent applications, and provisional application are incorporated herein by reference.

BACKGROUND

This invention relates to the fields of telecommunications and computer systems. More particularly, a method and apparatus are provided for presenting content to a caller and/or a called party before, during and/or after a communication session (e.g., a telephone call) between the parties.

Calls from or to a mobile telephone are typically accompanied by minimal display content. For example, when placing a call, the caller may simply see a dialer screen used to enter a telephone number, or to select a number or contact to be dialed. When receiving a call, a called party may see the caller's telephone number (or some other display if the number is blocked or unknown) or a name of the caller (if the caller's telephone number is stored in the called party's contacts), but little else.

Although this minimal information may be sufficient for the basic purpose of identifying who is being called or who has originated a call, it fails to deliver the type of multimedia experience many people have come to expect in the electronic age. Just as computer systems have evolved from textual operating systems (e.g., DOS or Disk Operating System) to complex graphical operating systems (e.g., iOS®, Android™, Microsoft Windows®), the display capabilities of mobile telephones have evolved in a similar manner.

Although mobile telephone applications that operate independently of telephone calls have been developed to take advantage of the telephones' richer display capabilities, such as offline games, photography and GPS (Global Positioning System) navigation, applications that make and receive calls or that operate during a call have not. Therefore, there is a need for methods and apparatuses for enriching the experience of a person making or receiving a call.

SUMMARY

In some embodiments, a method and apparatus are provided for presenting content to a caller and/or a called party in association with a telephone call or other communication connection. In these embodiments, content may be presented pre-ring (e.g., before the called party's telephone rings), in-call (e.g., during the call) and/or post-call (e.g., after one or both parties have hung up).

Content presented to a party may be related to that party, another party participating in the call (or other communication connection), or a third party (e.g., an advertiser that paid to have its content presented). Thus, rights to present content to parties engaging in a call may be auctioned to various advertisers and other organizations, and a party to a call may receive content that is or is not associated with any purpose or party to the call.

In some embodiments, presented content may be actuable (i.e., include one or more actuable controls), to allow a caller to change the destination or routing of a call, add or remove a party to/from the call, take advantage of an offer presented to him in the content, redeem a coupon, schedule or queue a subsequent call, respond to a query from another party, initiate some other desired action, etc.

In some embodiments, a person's ability to search for a desired destination party's contact information (e.g., telephone number) or to initiate a call to the party without knowing its number is greatly enhanced. In these embodiments, the person may initiate a direct or indirect search of any number of contact lists, telephone directories, and/or other databases, including lists maintained on his device and/or off his device—such as at a central call server or a third party repository.

Such a search may be conducted via keyword, so that as the person enters characters describing the target destination (e.g., by name, by category), the search is automatically updated and narrowed as the characters are entered. Results of a search may be filtered or prioritized based on the person's profile (e.g., with contacts known to that person having relatively high priority) and/or by a general profile (e.g., based on which numbers/contacts have been used most often or most recently by other people that conducted similar searches, and/or with respect to some other relevant or measurable attribute).

In some embodiments, one party to a call (e.g., the caller or a called party) provides some type of assistance to another party, regarding operation of the other party's communication device, operation of a program executing on the other party's communication device, obtaining a good or service, repairing or maintaining a good, supporting a service, making a diagnosis, retrieving desired information, or performing some other action or pertaining to some other subject matter. The one party may be associated with a particular organization (e.g., an organization that sold or that supports the device, a retail or wholesale organization), or may be a provider of concierge-type services, assisted shopping, or some other service to any number of other parties.

In association with the one party's assistance to the other party, the other party may be required to provide and/or confirm information regarding payment (e.g., for the one party's assistance, for a good or service or information that was ordered or obtained), such as a payment mechanism (e.g., a credit card, an electronic wallet), an account number, and so on. The other party's satisfaction of a payment requirement may be completed before, during, and/or after a related call, or may be performed as a separate event not associated with a particular communication connection. A "payment" may be a traditional form of payment using currency (including virtual currency and/or cryptocurrency), a credit/debit device (e.g., credit card, debit card), or a prepaid account, and/or may involve barter, exchange, equity, debt, or other type of legal transaction.

In some embodiments, real-time call control is applied when the communication connection is a telephone call from a caller (e.g., a private individual) to an organization represented by multiple agents. The call's control channel is diverted to a call controller, call server, or other entity, which determines a suitable termination point (e.g., a particular agent) for the call, and the call's voice channel is routed accordingly. During the agent's conversation with the caller, the agent may employ a data connection that allows the agent to obtain information from the call controller and/or other sources, regarding the caller, a transaction conducted with the caller, a good or service desired by the caller, a complaint from the caller, etc.

In some embodiments, a suitable agent or representative for engaging in a communication connection (e.g., a telephone call) is selected based on characteristics of the agent, the agent's employer/organization, and/or another party to the connection (e.g., language, gender, location), and possibly a topic of their communication (e.g., a particular good or service, information desired by the other party). Selection of the agent may occur as part of a method of providing real-time call control.

DETAILED DESCRIPTION

Figure 1:
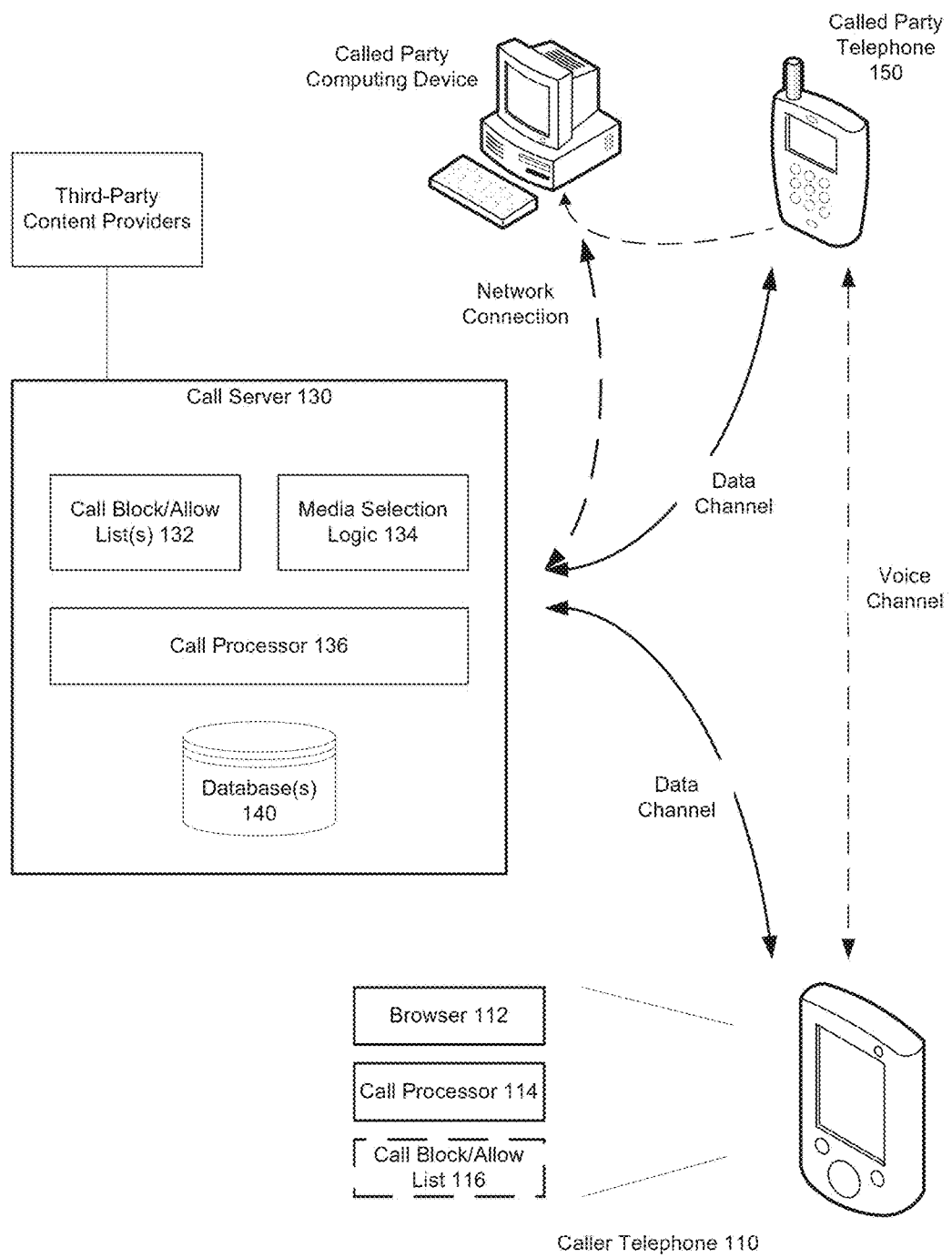
FIG. 1 is a block diagram of a communication environment in which some embodiments described herein may be implemented.

The following description is presented to enable any person skilled in the art to make and use the embodiments disclosed herein, and is provided in the context of one or more applications and their requirements. Various modifications will be readily apparent to those skilled in the art, and the general principles defined herein may be applied to other embodiments and applications without departing from the scope of the following description. Thus, the embodiments provided here are to be accorded the widest scope consistent with the principles and features disclosed herein.

Introduction

In some embodiments, a method and apparatus are provided for presenting content before, during and/or after a telephone call or other communication connection. The call or communication connection is not limited to only two parties. For example, it may be a group call or chat involving three or more parties.

The content is displayed on a device that initiates or receives the call or connection, if the device's display is capable of displaying rich content; otherwise, it may be displayed on an associated computing device. In these embodiments, the displayed content may be selected based on an identity or a characteristic of the caller or the called party, may be relevant to a purpose or nature of the call, or may be selected by an entity that paid to have the selected content presented.

For example, for a telephone call between friends or acquaintances, a caller or called party may be presented with content drawn from a social media or other distributed electronic presence of the other party (e.g., Twitter™, Skype®, Snapchat®, Instagram®, WhatsApp®, LinkedIn®, MySpace®, Facebook®, Flickr®, Google+™, Google Voice™, Apple iMessage®, Flickr®) or from private storage (e.g., the friend's computing device). Or, he may be shown recent electronic mail, other communication(s) involving the friend (e.g., his or her latest tweet on Twitter), or other content the friend is willing to share. In some embodiments, people may assemble content for the specific purpose of having it presented to another party in association with a telephone call or other communication connection.

For a telephone call with an organization (e.g., a merchant, a business), an advertisement or special offer from that entity (or from an associate or a competitor of that entity) may be presented (e.g., a video ad, a social media ad, a Google AdSense Ad™, a yellow page ad), or a menu or list of services, directions or location information, information regarding a current or recent transaction, etc.

Content presented before, during, and/or after a telephone call may be accompanied by one or more controls for taking action, such as seeing more content, navigating to a particular web page or web site, downloading content, ordering a good or service, adding another party to the call, re-routing or aborting the call in favor of a different destination, sharing the content displayed on one party's device (or some other content) with another party, terminating the sharing or presentation of content, or initiating other action enabled by the content.

As used herein, a "service" related to content presented to a party (e.g., a service ordered by a caller) is intended to encompass not only repetitive activity (e.g., a subscription to a publication or information feed, telephone service, or some other utility), but also single or individual activities or solutions as well as a combination of a single activity and repeated activities. For example, some illustrative services include diagnosing a problem from an image or video of mechanical or electrical equipment (e.g., an engine, a computer), making a medical diagnosis from a suitable image (e.g., an image generated using radiography, Magnetic Resonance Imaging or MRI, ultrasound, tomography, or thermography), providing input to a 3-D printer, and analyzing a video or image of a scene (e.g., a crime scene, a crowd of faces, a view from an unattended camera in a natural habitat). A service may also, or instead, involve identifying or proposing one or more solutions to a specified problem or a condition depicted in an image or video.

Determination of what content to present to a party is made by a call controller. In embodiments described herein, a controller for a particular telephone connection may be the caller, a called party, a call center configured to process content in association with a telephone call, or some other third party. The decision of what to present may be made in real-time, or may be predetermined.

For example, a commercial message (e.g., an advertisement, an offer) may be pre-selected for presentation to some number of callers to a particular telephone number. Merchants or other organizations may pay for the opportunity to have their selected content presented to a caller or called party, even if the paying organization is not a party to the call.

In some embodiments, content selected by one party for presentation to another party before, during, and/or after a call between the parties may include some or all content presented (e.g., displayed, played) on the one party's communication device. For example, the one party may share his or her display, or a portion of the display (e.g., one window), so that both parties can mutually enjoy the content. Also, or instead, either party may assist the other with manipulation or understanding of the content or an associated application, make recommendations regarding the content (e.g., which of multiple products or services to purchase), assist with directions to a destination, etc.

During the sharing of content, the shared content may be manipulated (e.g., to select menu options, to browse or co-browse), annotated, highlighted, or otherwise affected by either or both parties. Thus, one party may highlight for the other which controls or menu options to actuate in order to achieve a particular goal, may actuate those controls for the other party, may make notations or marks on the content, may overlay the other party's display with other content (e.g., to provide a sample view of the result of actuating a particular control), may browse to additional content, etc.

As indicated above, embodiments are not limited to communication connections or content-sharing involving only two parties. Thus, content may be selected by one party for presentation to multiple other parties, or vice versa, multiple parties may observe or share content presented (or residing) on one party's device, and so on. Also, a given party participating in a communication connection may be an individual or (a representative of) an organization, and different parties may select content to be presented or shared, and/or control the presentation/sharing of the content, at different times.

Although some terms used herein reflect telephonic communications, such as "caller," "called party," "telephone," "call," "pre-ring," "in-call," and "post-call," one of ordinary skill in the art will appreciate that methods of presenting content (or controlling presentation of content) in association with other types of communication connections (e.g., chat sessions, group chat sessions, video calls) are also within the scope of this disclosure. Terms encountered herein thus have different connotations depending on the types of communications being conducted.

Content Presentation in Association with a Telephone Call

FIG. 1 is a diagram of a communication environment in which content may be presented in association with a telephone call, according to some embodiments. In FIG. 1, caller telephone or device 110 is used to place a call to a called party at called party telephone or device 150. Call server 130 acts as a call controller to manage the presentation of content on the caller's device or telephone and/or the called party's device or telephone in association with the call.

In FIG. 1, each telephone is capable of supporting parallel data and voice channels. A voice channel between caller telephone 110 and called party telephone 150 may be established through the PSTN (Public Switched Telephone Network), one or more telephone carrier's networks, other public/private networks such as the Internet (e.g., for VoIP calls), etc. Specifically, a telephone or other electronic/communication device described herein as participating in a communication connection (e.g., a call) supports traditional telephone connections (e.g., through POTS or Plain Old Telephone System) and/or digital telephony (e.g., VoIP). In illustrative embodiments, a party's communication device may be a smartphone, a tablet, or other mobile (or stationary) device having telephony capability.

Data channels to/from a party's telephone may be established using EvDO (Evolution Data Optimized or Evolution Data Only), UMTS (Universal Mobile Telecommunications System), HSDPA (High-Speed Downlink Packet Access or High-Speed Downlink Protocol Access), LTE (Long Term Evolution), VoLTE (Voice over LTE), and/or other communication protocols and links capable of carrying digital data. The data channels are routed via call server 130, and are used to convey content to the telephones and to convey other data to the call server as necessary (e.g., to upload data from a telephone, activate a control within presented content).

Caller telephone 110 hosts any number of applications, applets, plug-ins, or other collections of executable program code. Illustrative code that may be installed on the caller telephone includes browser 112 for presenting and navigating content, one or more other applications in addition to browser 112 (e.g., a game, a chat utility), call processor 114 (e.g., a dialer application) for processing an outgoing or incoming call, and optional block/allow list 116.

Call processor 114 comprises logic for detecting and/or controlling telephone events (e.g., dialing of a number, outgoing call ringing, incoming call ringing, outgoing or incoming call connected) and for using the data channel to receive content to be presented and to submit data to the call server and/or other destination (e.g., another party to the call). Call processor 114 may comprise logic that hooks into a telephone dialer application and can control how a call is handled. Or, the call processor may comprise logic that replaces or supersedes a device's native dialer application.

In some embodiments, call processor 114 may delay signaling of a voice call from caller telephone 110 to the caller's telephone service provider, in order to delay establishment of the voice channel. The call processor may do this automatically or based on instructions from the call server. Similarly, ringing at a called party's telephone may be delayed.

For example, calls placed to certain numbers or to certain types of parties (e.g., merchants, other organizations) may be delayed while content is selected and transmitted to the caller's telephone and/or a device operated by the called party. A timer may be displayed on the telephone and/or the caller may be able to terminate the delay and make the call proceed immediately. Thus, a delay may be fixed or may be aborted by the affected party.

A call processor may also comprise logic for performing keyword-based lookups, or may be configured to invoke similar logic that executes separate from the call processor. For example, when a caller enters part (or all) of the name of a person or organization that she wishes to call (or a partial telephone number), the keyword logic will search the called party's telephone for matching contacts.

The call processor, or other logic, may also contact a central location (e.g., call server 130) to initiate a keyword-based search on a larger telephone directory. Thus, a search for a destination party may be automatically conducted on the caller's telephone and/or off the device at a central location (e.g., call server 130) or a third party directory. As the caller enters additional characters, the search results are narrowed accordingly, and may be prioritized based on the caller's previous interaction with some of the contacts, based on which destination parties other callers selected in similar searches, based on the caller's present location, based on fees paid by merchants for priority listing, etc.

Other software may be installed on a party's communication device to alter or enhance the presentation of media. For example, a set of APIs (Application Programming Interfaces) may be provided to allow injection of particular types of content. The APIs may be used to facilitate presentation of content in association with a telephone call and/or without any association with a telephone call. However, in some embodiments, a person's communication device need not be modified in any way in order to receive and display content before, during, and/or after a call.

In the illustrated embodiments, caller telephone 110 (and/or call server 130) automatically blocks or rejects calls attempted between telephone 110 and telephone numbers (and/or people and organizations) identified in a block list. Additionally, or alternatively, an allow list may be maintained to specifically identify telephone numbers with which caller telephone 110 is permitted to be connected (e.g., all entries in a contact list or telephone directory maintained on a party's telephone). In yet other embodiments, a single combined block/allow list may be maintained to identify target telephone numbers and indicate whether calls with those numbers are blocked or allowed. A list of allowed and/or blocked telephone numbers or other identifiers of destination parties (e.g., screen names, chat handles, IP addresses, URLs) may be limited or expanded based on parameters such as the location of the caller and/or a called party, current time (e.g., at the caller's or called party's location), available communication bandwidth, and so on.

Block/allow lists may be maintained on a user's telephone and/or at a call controller or call server. A block/allow list maintained on telephone 110 (i.e., block/allow list 116) may be considered a "local" list, while a list maintained on a call controller (e.g., block/allow list 132) may be considered a "central" or "global" list.

In some embodiments, a block/allow list (or other filter) may be used to screen calls to/from malicious telephone numbers or entities. For example, calls received from telephone numbers known to be associated with telemarketers, spammers (e.g., entities that spam via SMS or Short Messaging Service), pranksters and/or other undesirables may be blocked automatically (or after querying the called party to identify the call as possibly or certainly being from an undesired party).

Illustratively, a global list may be maintained to identify telemarketers and spammers, especially those that call nationally or regionally. A local list may be maintained to block calls from pranksters, people who have made harassing calls and/or other parties from whom calls are not desired.

A called party may identify a caller as malicious (or, alternatively, not malicious) during or after a telephone call from that caller, by activating a control on her telephone. For example, during or after a call from a previously unknown caller, content may be presented to the called party to ask her if the caller is a telemarketer or harasser (or should otherwise be blocked), or if the caller should be added to her contact list. Choosing to add a previously unknown party or number to her contact list may cause the call server to interrogate the caller's telephone or other data source to retrieve a contact card, if one has been prepared for sharing.

In some embodiments, caller device 110 may include additional components or executable code for performing other functions, without exceeding the scope of the present disclosure. For example, a telephone may also include one or more storage components for storing, among other things, contacts, user preferences, content to be presented on the telephone or to be transmitted to another party for presentation on their device, etc.

Locally stored content may be quickly presented to a user without having to wait for receipt of the content from call controller 130. Such stored content may be selected for storage and/or presentation randomly, based on an identity of the a party or parties within a contact list stored on the telephone, according to an agreement with a third party (e.g., an advertiser) and the call server or call controller, etc.

Called party telephone/device 150 may be configured similarly to caller telephone/device 110 (e.g., with a browser, a call processor, a block/allow list). In some embodiments, when a call is being initiated from caller telephone 110 to called party telephone 150, call server 130 may query the called party's telephone to determine if it possesses any content that the called party would like to have presented to the caller. Such content may then be transferred before, during, and/or after the call. Similarly, content from caller telephone 110 may be copied to called party telephone 150.

When a user's telephone is unable to display content chosen for presentation to that user in association with a telephone call, the content may instead be presented via a different device.

For example, and as shown in FIG. 1, a called party (or a caller) may operate an associated computing device (e.g., a desktop computer, a laptop computer, a personal digital assistant, a netbook computer). The computing device may be registered with a call controller (e.g., call server 130) before or during a call (e.g., by IP address or other network address).

When the call controller determines that it cannot present pre-ring, in-call, and/or post-call content on called party telephone 150, it will instead transmit it to the associated computing device. The call controller may determine that it cannot send content to telephone 150 based on the type of telephone or the telephone number (e.g., a landline), because the telephone connection lacks a data channel, because the device is registered in the called party's user profile, etc.

A party's associated computing device may be coupled to call server 130 by a network connection that traverses one or more public or private data networks (e.g., the Internet, an intranet). To register a computing device, a party may operate the computing device to navigate a browser to a registration site or page. There, the party may identify one or more telephone numbers and associate them with the computing device so that when a call is placed to or from one of the telephone numbers, content will be delivered to the computing device instead of the telephone.

Call server 130 comprises central or global block/allow list 132 for screening a call to determine whether it should be placed and/or whether content should be presented in association with the call. The call server also includes media selection logic 134 for selecting content to be displayed on a caller's or called party's communication or computing device. Call processor 136 is configured to receive or establish data (and/or voice) channels with caller telephone 110 and/or called party telephone 150 via virtually any data protocol and media.

Central call processor 136 (or some other component of call server 130) may thus incorporate some or all functionality of a local call processor (e.g., call processor 114), to support or enable delayed establishment of calls and/or other communication connections between devices, to perform lookups of contacts, to screen calls with a block/allow list (e.g., list 132), to select content to be presented on one or more devices (e.g., using logic 134), to transmit content to be presented on a device, etc.

Database(s) 140 are configured to store data regarding subscribers and their communication/computing devices, content that may be presented on such devices, information regarding advertisers and/or other third parties that may provide content, factors for determining or selecting content to be presented for a particular call, etc. Call server 130 may also expose various APIs (Application Programming Interfaces) to allow third parties to provide media for presentation in association with a telephone call, and/or other logic for retrieving or obtaining such content from a third party.

A call server or call controller according to other embodiments may be configured to perform a subset or a superset of the operations described herein, and therefore may include fewer or additional components. Call server 130 is an example of a third party call controller—that is, a controller that is not operated by the caller or a called party. Illustratively, call server 130 may be operated by a telephone service provider, a data management service, a directory service, or some other entity with which the caller and/or called party (or their service providers) have established agreements.

In other embodiments, a call controller may be operated by a caller or called party, particularly when that party represents an organization. Thus, a call to or from a commercial enterprise may be controlled by an agent of that enterprise (e.g., a telephone agent or operator, a sales agent, a customer service representative, a technical support representative, a concierge). That agent can select content for presentation on the other party's communication device based on a purpose of the call, a previous or current transaction between the parties, an offer being made to the other party, etc. Or, such content may be selected automatically, based on whether the organization has a pre-existing relationship with the caller (e.g., whether the caller's telephone number is known), which of multiple telephone numbers of the organization the caller called, etc.

In some embodiments, a call controller, call server, or associated entity may auction or directly sell a right to have content presented to callers and/or called parties. For example, an entity that operates a call server may auction the right to present content to callers that dial a particular organization (e.g., a commercial company) or that are called by the organization. The winner may be the same organization, a competitor, or an unrelated party.

Or, an entity that operates a call server may auction content presentation rights based on identities or demographics of private callers and calling parties. Thus, content presented to a party may be selected based on his current location, as reported by a GPS (Global Positioning System) element of his communication device, his country code (if applicable), his area code, his telephone exchange or number, his city, his type of communication device, his telephone service provider, and so on. For example, a content provider may be a vendor of goods or services and may have purchased the ability to have content presented to callers who place calls while they are within some predetermined distance of the content provider.

Content presented on a communication device may fill the area of the target party's telephone display screen, or only a portion thereof. For example, when a call is placed to a commercial organization, content from a single source may cover the caller's entire telephone display. But, when a call is placed to one private party from another private party, some or all of the display area may be used to present content associated with one or both parties (e.g., from Twitter™, Skype®, FaceTime®, Snapchat®, WhatsApp®, LinkedIn®, Facebook®, MySpace®, Instagram®, YouTube® Google+®, Flickr®), and only a small area may be filled with content (e.g., an advertisement) from a third party. Thus, content displayed on a party's telephone may comprise multiple content components from the same or different sources or providers.

When content is presented to a caller pre-ring (e.g., before a destination party's telephone rings, before a chat session is established with a recipient of the communication connection), the caller may activate a control embedded in the content to take some action offered by the content. For example, if he activates a control to re-route the call to a different destination (e.g., based on an offer or advertisement in the presented content), the call controller or the call processor logic on the caller's telephone will cancel the attempted call and initiate a call to the new destination. Or, a caller may be presented with content that offers to route the voice channel differently (e.g., via a different carrier for a cheaper rate).

In some embodiments, a call server and a separate call controller may cooperate to control the presentation of content to a caller and/or a called party. For example, and as shown in FIG. 1, data channels may be established between the parties and a call server, and the call server may be responsible for actually transmitting content to the parties and receiving any data they submit.

The separate call controller, however, may be a third-party content provider (or other third party) and may determine (and/or dynamically provide) content to be provided to a particular party. Thus, a call server may participate in many calls, and connect to different call controllers for different calls (or at different times during one call) to receive content to be presented to a party. Even when a call server and a call controller are co-located or comprise a single entity, content to be served to callers and/or called parties may be retrieved from other parties.

As one alternative, a call may be initially handled by a call server, perhaps to facilitate presentation of appropriate pre-ring content to a caller or called party. However, at some point (e.g., when the called party's telephone rings, when a chat session is established), control of content presentation may be passed to a call controller associated with or employed by the called party. As yet another alternative, control of content presentation may be passed immediately to an organizational call controller when a call destined for that organization is identified.

Figure 2:
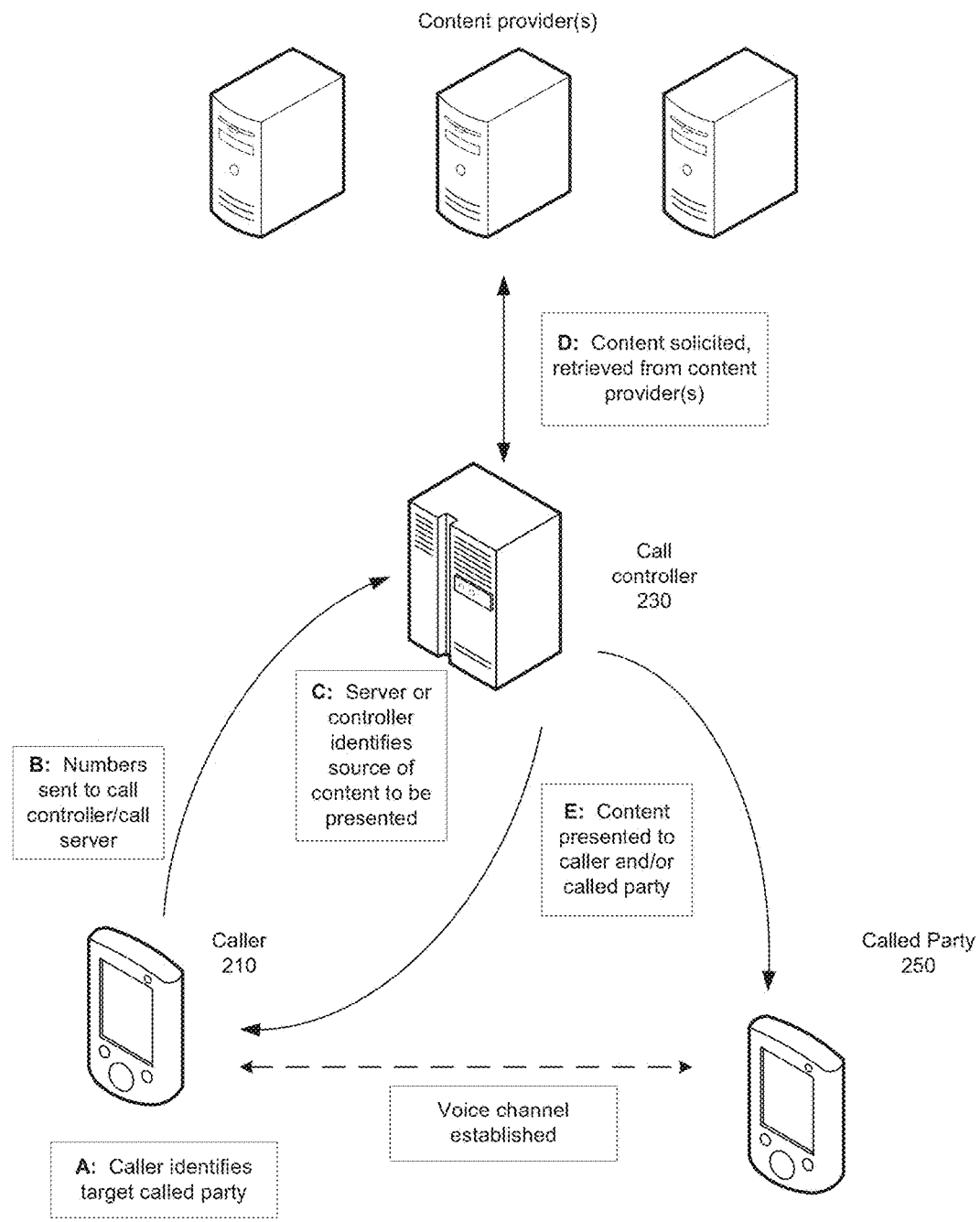
FIG. 2 is a block diagram demonstrating establishment of a telephone call and associated presentation of content, according to some embodiments.

FIG. 2 is a diagram illustrating presentation of content to a caller and/or a called party in association with a telephone call, according to some embodiments.

At step A, the caller enters or selects a telephone number or contact listing for called party 250, in order to initiate a voice call to that party. Alternatively, she may enter part of the target party's name or number and select the party from results produced by her communication device and/or a source external to her device. At step B, the telephone numbers and/or other identifiers of the caller and called party (e.g., IP addresses if either party is using VoIP equipment) are transmitted to call controller/call server 230 via a data channel of the caller's telephone.

Control of the call may be passed to a particular call controller, based on an identity of the caller or the called party. Specifically, calls from a certain number (or set of numbers, such as those of a single organization) or to a certain number (or set of numbers) may be controlled by predetermined call controllers. Or, call controller 230 may be a general call server configured to handle presentation of calls involving multiple private parties and/or organizations. In some embodiments, the terms call server and call controller are synonymous, and either entity may delay (or support/enable delayed establishment of) a communication connection; enable presentation of pre-ring, in-call, and/or post-call content; support sharing of content between device; and so on.

In step C, call controller 230 identifies a source of content to be presented to caller 210 and/or called party 250, or may identify specific content (i.e., not just a content source). In step D, the call controller solicits content from a selected source, which may be a web server, a data server, an advertisement server or other repository of advertisements, an organization's data server, the called party, the caller, etc.

Content may be selected for presentation based on an identity of a particular party, a relationship between the caller and the called party, an assumed (or known) purpose of the call, previous purchases or other behavior of a party, the location of a party, the local time with respect to a particular party, and/or other factors.

In step E, call controller 230 forwards the selected content to either or both of the caller and the called party. In some embodiments, the content may be served directly to a caller or called party from a content provider. Content may be presented to either party before the called party's telephone rings, during the parties' call and/or after the call is terminated.

The voice channel between caller 210 and called party 250 may be routed and established in a normal fashion. However, initiation of the connection may be delayed for a short period of time (e.g., by call processor logic operating on the caller's telephone). Thus, the actual voice connection may be completed any time after step A.

Illustrative content that may be presented to a caller or a called party pre-ring includes commercial offers and advertisements (e.g., if the other party is a commercial organization), private content such as pictures, communications, present status, current location (e.g., if the other party is a private individual), notifications, alerts, an identifier of the other party to the call (e.g., a corporate logo, a personal avatar), etc. As part of pre-ring or pre-call content, a caller may be able to better target his destination party. For example, if he is calling an organization's main (or toll-free) number, he may be presented with content that allows him to choose a particular office or outlet (e.g., based on city or address), a particular department (e.g., customer service, technical assistance), etc.

Illustrative content that may be presented to a party during a call includes any or all types of content that may be presented pre-ring. In-call content may also or instead relate to the parties' voice connection, perhaps to provide visual description of a subject of the parties' conversation, to graphically show different products or product options, to show a transcript of the conversation in real-time or near real-time (or provide other assistance to a hearing-impaired party), to guide a party through an IVR (Interactive Voice Response) menu, to provide customer assistance graphically (instead of or in addition to verbally), to exchange information textually/graphically instead of having to speak it or punch it in via a keypad, to promote an up-sell, to guide a party through an organization's telephone directory to find a desired person, to share content displayed on or stored on one party's device, to recreate annotations (e.g., mark-ups, comments, highlights, drawings) generated on one party's device on another party's device, etc.

Illustrative post-call content includes content that may be presented pre-ring and/or in-call. Post-call content may also or instead summarize the parties' conversation or transaction, provide a receipt, identify follow-on actions, confirm a later appointment or other scheduled event, return a party to a previously viewed set of content, etc. In some implementations, presentation of post-call content may entail providing to a party's device a link or reference to the content, in which case the device retrieves and presents the content to the party.

Figure 3:
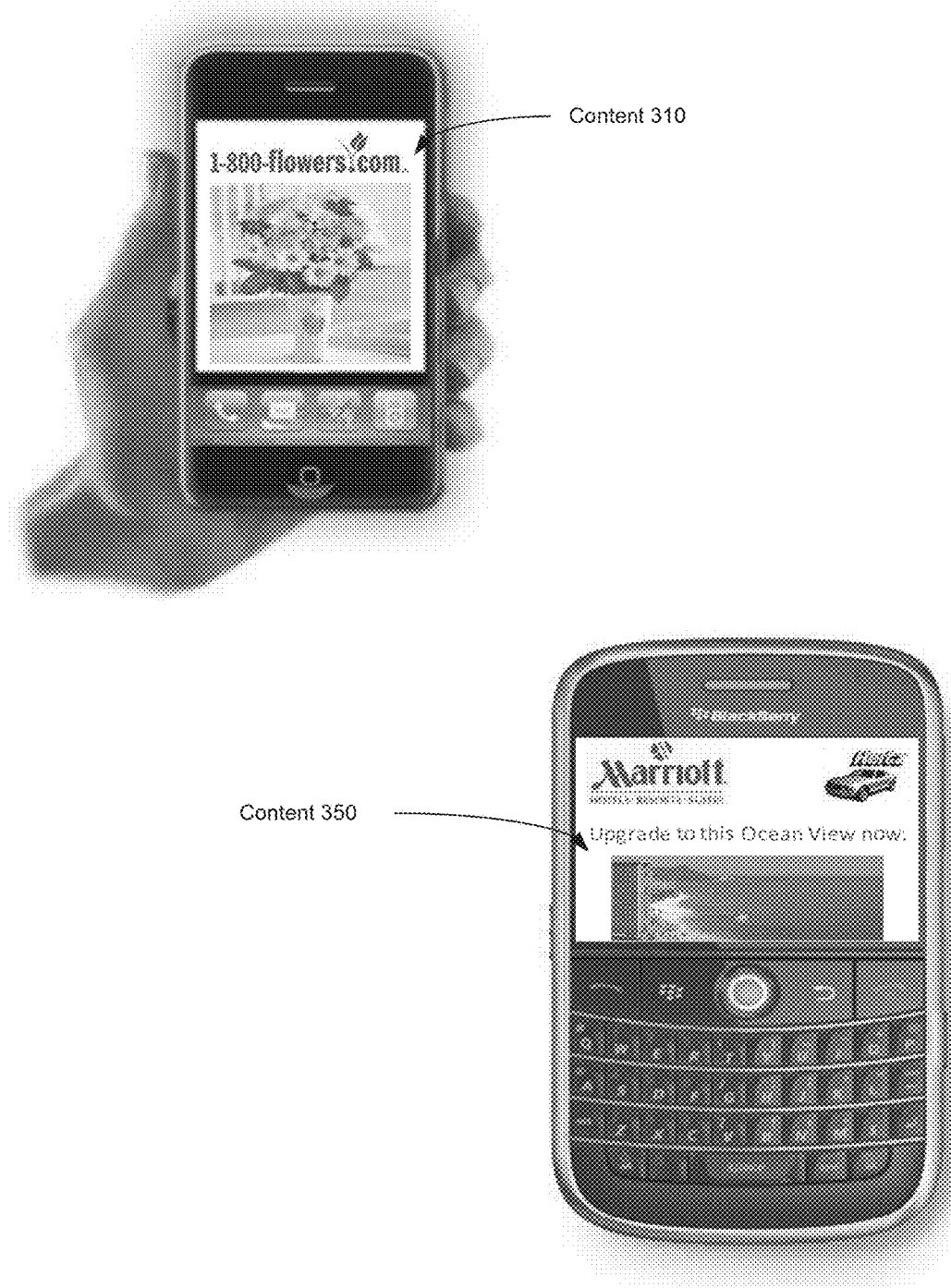
FIGS. 3-8 demonstrate content that may be presented on a communication device of a caller and/or a called party before, during and/or after a telephone call, according to some embodiments.

FIG. 3 illustrates content that may be presented to a caller or a called party in association with a telephone call, according to some embodiments.

Content 310 reflects the presentation of a logo, profile, or other content that identifies an organization. In particular, content 310 comprises an advertisement of a merchant. Content 310 may be presented to a caller when she initiates a call with the indicated merchant, or may be presented to a called party when the merchant calls her (e.g., to verify an order, to report on an order status, to obtain additional information). Or, the illustrated content may be presented when a person engages in a call with a competitor of the indicated merchant, or another party unrelated to the merchant.

Content 350 includes not only a logo or other visual illustration of an organization, but also presents an offer of a product or service (i.e., a room upgrade). Illustratively, the recipient of content 350 may have booked a room reservation (with the indicated merchant or a competitor), or may be in the process of making a room reservation.

Thus content 350 may be presented while the recipient is engaged in a call with the offering merchant, in which case the recipient can verbally accept the offer or make an inquiry. Or, if the offer is presented when the recipient is not currently engaged in a call with the merchant, hitting a "dial" button, tapping the screen (if it is touch-sensitive) or activating another control may initiate a call between the recipient and the advertising merchant so that she can take advantage of the offer.

In FIG. 3, a call controller managing the presentation of content 310 and/or content 350 may be a merchant featured in the content, especially for a call placed to the merchant or from the merchant. Or, the call controller may be a call server or other third party. Because the call controller may be a third party, calls during which the content is presented may not even involve a merchant identified in content 310 or content 350.

Figure 4:
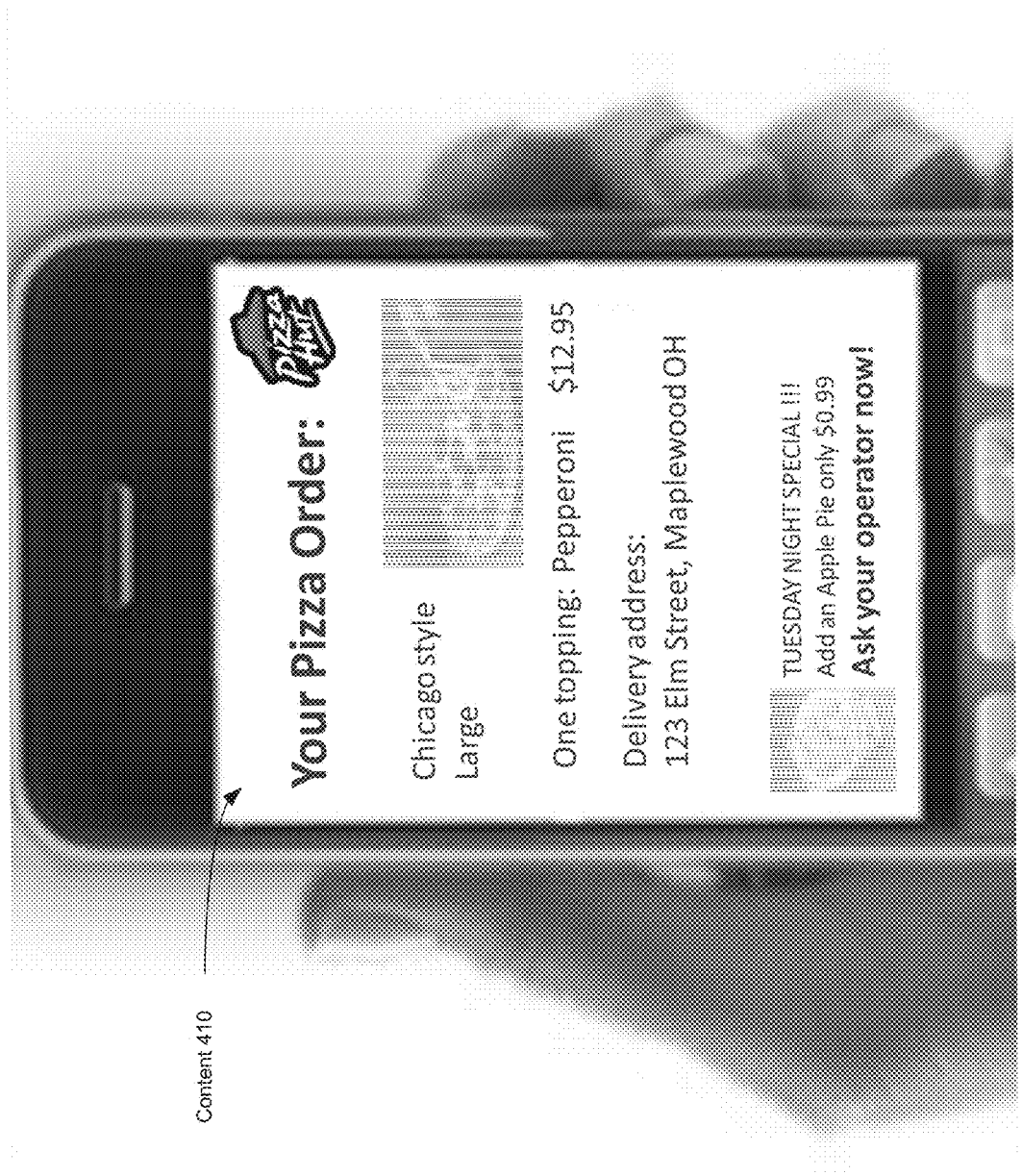

FIG. 4 also illustrates content that may be presented to a caller or called party in association with a telephone call, according to some embodiments.

Illustratively, content 410 may be presented to a caller during a call with the indicated pizza vendor. Content 410 not only allows the merchant and the caller to verify the caller's current order, but also comprises an advertisement or offer for an additional purchase, and may be presented before, during, or after the call. Specifically, content 410 verifies the customer's order (i.e., for one large Chicago-style pizza, with pepperoni) and the delivery address, and also reminds the customer of a special offer (i.e., $0.99 apple pies on Tuesday nights).

Content 410 may also, or instead, provide a control that the caller can actuate to cause the caller's address (e.g., home address, work address, current address) to be transmitted to the merchant or call controller. Illustratively, address information may be stored on the caller's communication device (e.g., in a contact record associated with the caller) and may be automatically transmitted to another party when the caller initiates such action.

In FIG. 4, the call controller that manages the presentation of content on the customer's telephone may be a telephone agent associated with the pizza merchant. In this case, when the customer called the merchant, a data connection was automatically established between the controller (which may be local to or remote from the customer) and the customer. Thereafter, the call controller can determine what is presented to the caller.

Figure 5:
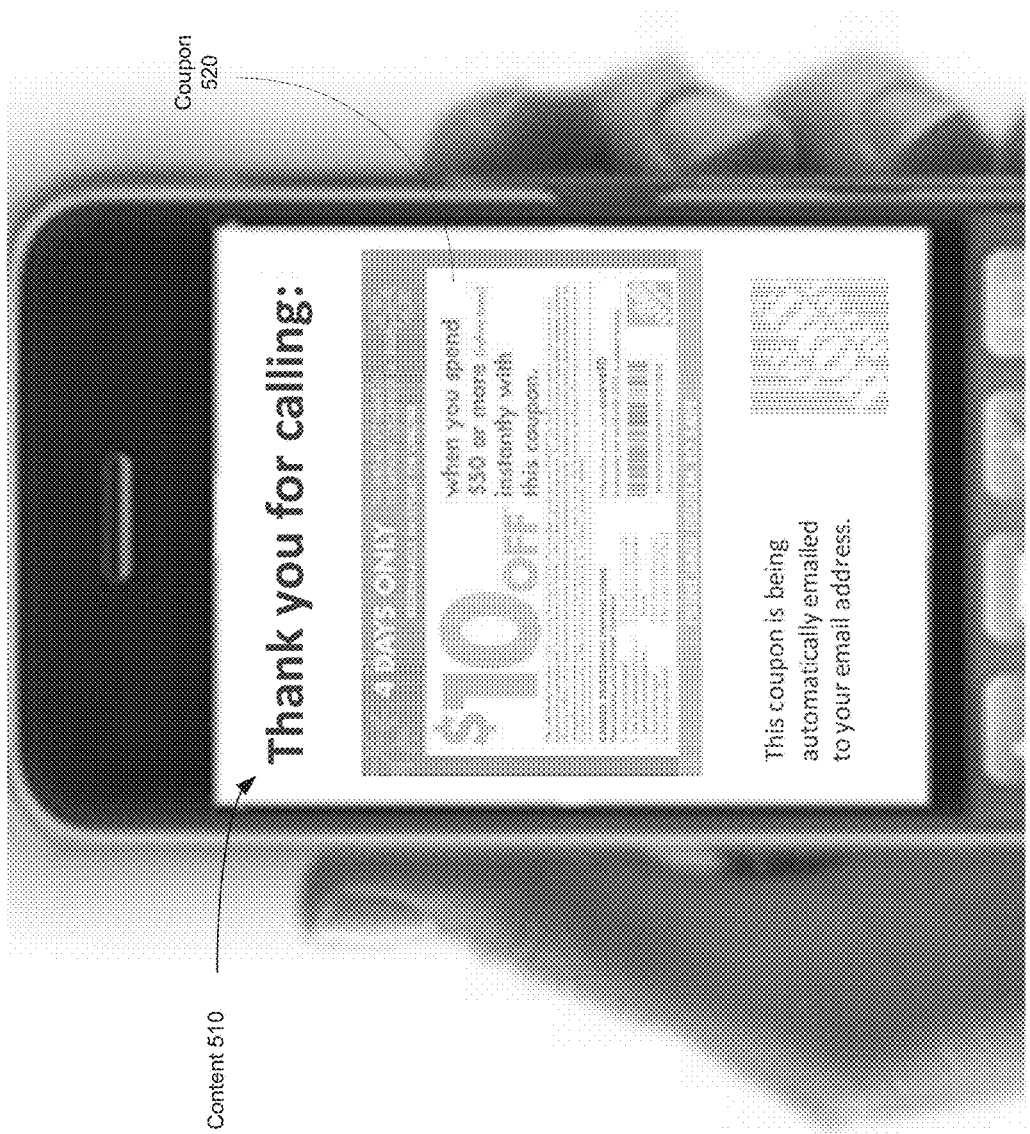

FIG. 5 also illustrates content that may be presented to a caller or called party in association with a telephone call, according to some embodiments.

Content 510 of FIG. 5 identifies a merchant or other organization with which a person has established a telephone call, completed a telephone call, or is about to call, or possibly a competitor of such a merchant. Content 510 includes coupon 520, and may be used during a call with the advertiser or offline (e.g., in person in a retail store). As indicated, the coupon may be automatically transmitted to the person's email address if the call controller or an associated call server knows his or her address, or if the person releases the address.

In other embodiments, other content may be presented to a party when he is engaged in a call with a merchant, or has initiated a call to a merchant. For example, the party's last transaction may be displayed, an outstanding balance or other account status may be presented, another merchant advertisement (e.g., from the yellow pages, from an email campaign) may be displayed, a status of a customer service request or complaint may be presented, etc.

A call reflected in FIG. 5 may be controlled by the organization identified in the content (e.g., a telephone agent that is talking with or has talked with the customer) or by a third party (e.g., a call server).

Figure 6:
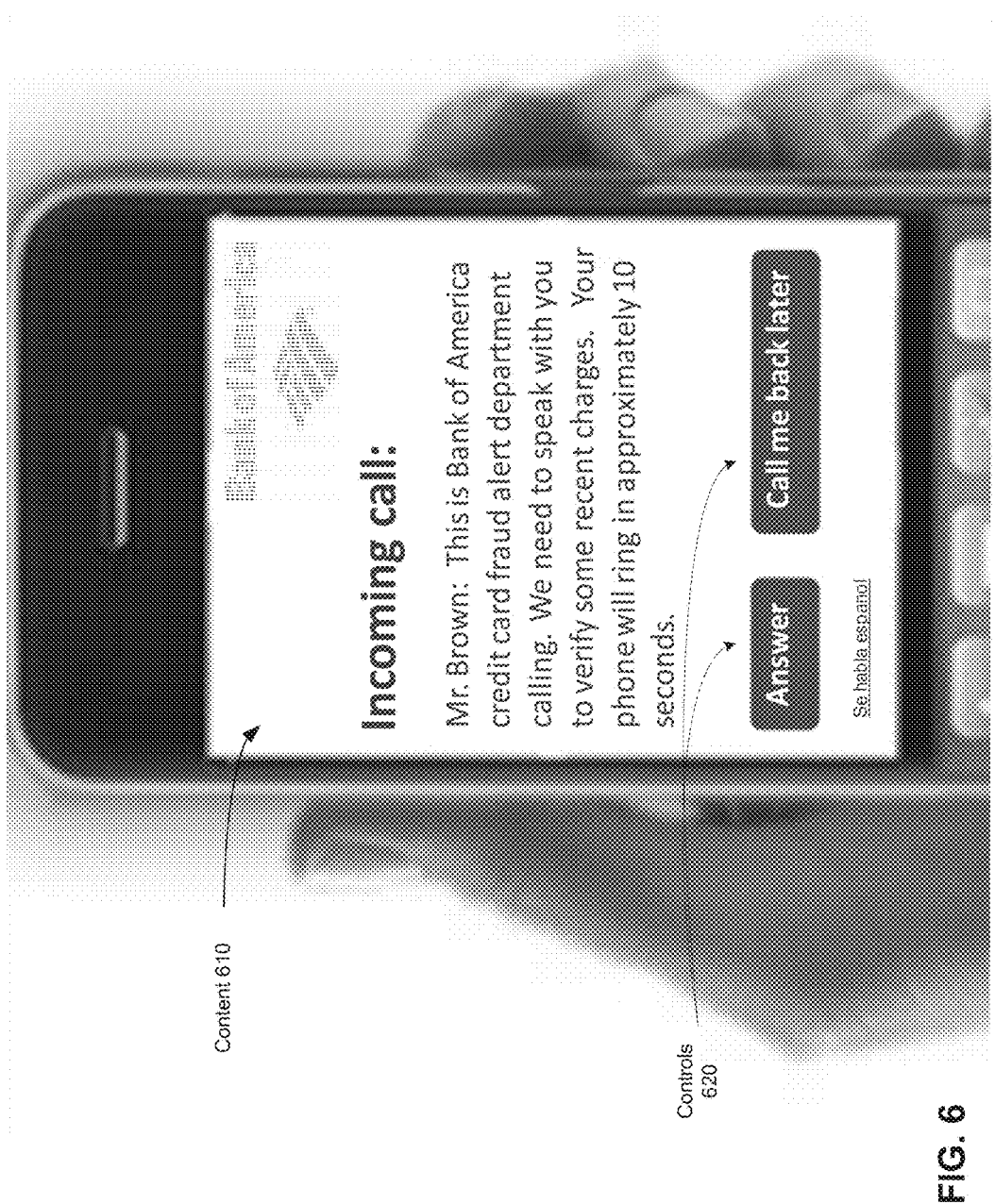

FIG. 6 illustrates content that may be presented to a potential called party in association with a telephone call, according to some embodiments.

Content 610 of FIG. 6 may be presented to a called party pre-ring (i.e., before her telephone rings), in association with a pending call from an organization, such as the indicated bank. As shown in FIG. 6, the content advises the party that the organization is placing a call to her telephone, and indicates a reason for the call. The party may be able to defer the call, agree to answer it, or take other action (e.g., send an electronic mail message, initiate an inquiry or complaint), by activating a corresponding control 620.

In some embodiments, advisory pre-ring content such as content 610 may include information to help verify the authenticity of the source of the upcoming call. For example, the organization may include some digits of the person's account number, give details of a previous transaction with the organization, etc.

In some embodiments, pre-ring content may include controls for taking action such as accepting the call as planned, completing the call immediately, postponing the call, scheduling it for a particular time, selecting content to be discussed during the call (e.g., an account balance, a bill, a page of the organization's website), etc. Such controls may be included as part of the pre-ring content, or may be added by the call controller or the call processor logic on the receiving party's communication device.

A call controller for presenting content 610 may be the organization that wishes to contact the called party (e.g., a telephone agent, an account representative), or may be a third party.

Figure 7:
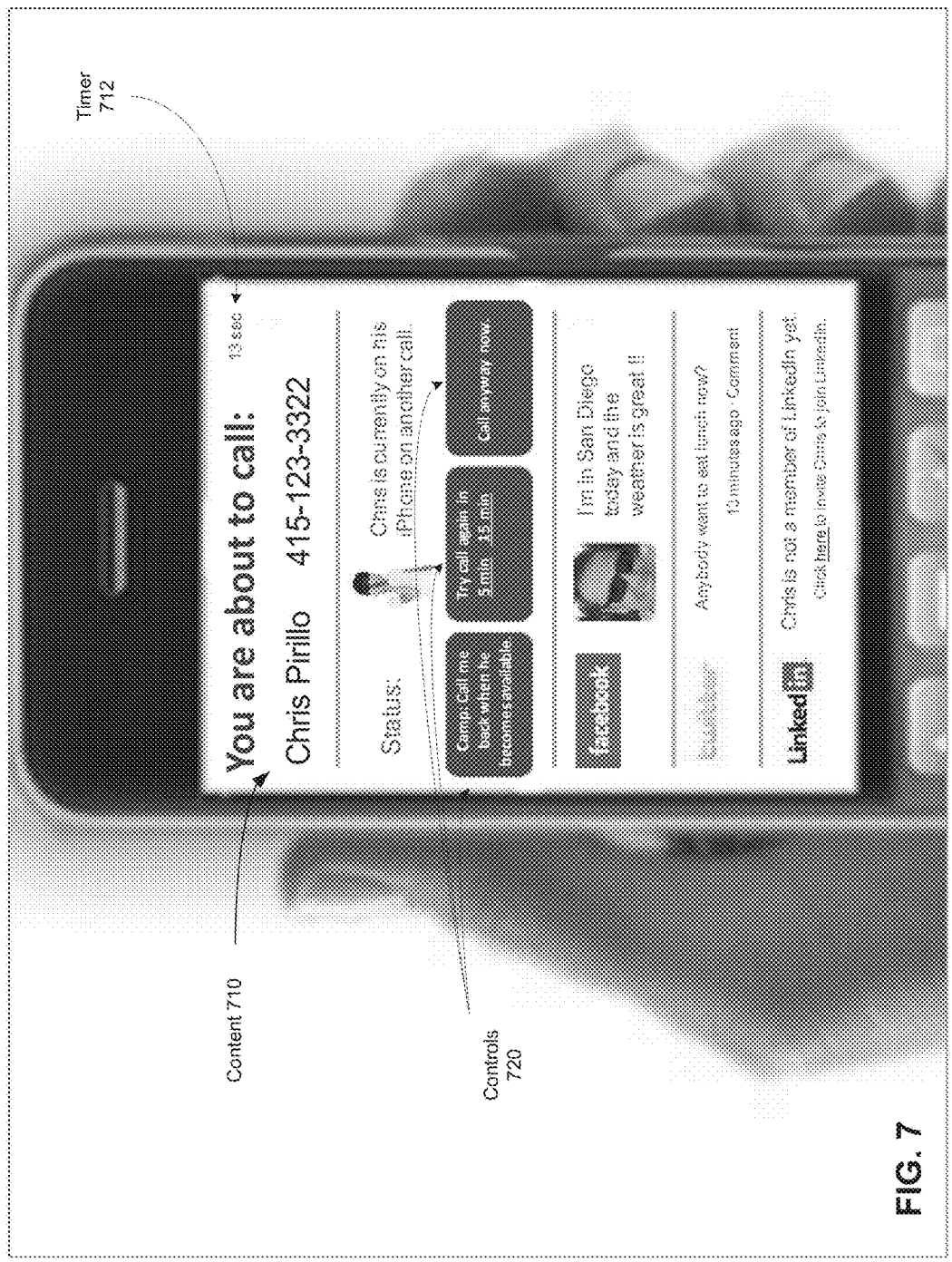

FIG. 7 illustrates content that may be presented to a caller in association with a telephone call, according to some embodiments.

Content 710 of FIG. 7 is presented to a caller pre-ring, when he commences a call to a friend or acquaintance (e.g., someone within her list of contacts or friends). Instead of only seeing the name and/or number of the person he is calling, the caller receives additional information regarding the called party and/or other people, such as a picture of the called party.

Pre-ring content 710 reports the current status of the target called party, which may be determined by the call controller or call server handling the data portion of this call. His status may be tracked by the call controller, especially if the call controller is associated with the called party's telephone service provider, for example, in which case it can easily stay apprised of the status (e.g., location) of the party's telephone.

Thus, the target called party's status may indicate that he is currently on another call, that he is otherwise busy, that his telephone is turned off, etc. Illustratively, he may have activated a control on his telephone that reports his status. Based on the called party's status, the caller may be offered options to have a return call placed to the caller when the called party is available, to try the call again, to continue with the call (e.g., to leave a voicemail or media message), to camp and wait for the called party to become available, etc.

Content 710 also includes an excerpt from the called party's (or a third party's) electronic presence (e.g., an excerpt from LinkedIn®, Facebook®, YouTube®, Instagram®, MySpace® or other web site), a recent Twitter™ or Snapchat® message (from the called party or a mutual friend/acquaintance, which mentions the caller or the called party), an offer to make a further connection with the called party (e.g., via LinkedIn®, hi5, Skype®, FaceTime®), a recent photo posted by the called party, and so on.

As indicated in FIG. 7, content 710 may be presented as pre-ring content, but some elements of the content may also (or instead) be presented as in-call and/or post-call content. Alternatively, in-call and post-call content may be completely different from content 710.

The called party may be presented with similar content pre-ring, in-call, and/or post-call. Of course, instead of seeing content about himself, the called party may be presented content associated with the caller and/or third parties (e.g., mutual friends and acquaintances).

Content 710 includes timer 712 that indicates how soon the voice channel of the call will be connected or routed for connection. Illustratively, the voice connection may be delayed in order to determine and present the called party's status, to retrieve content to be presented, to allow the caller to review content 710 or to choose an alternate course of action if the called party is not currently available, or for some other reason. A control (e.g., one of controls 720) may, however, allow the caller to terminate the delay and proceed with (or attempt) the voice connection immediately.

A call controller for controlling presentation of content 710 in FIG. 7 may be the called party or a third party (e.g., a call server, a telephone service provider of the caller or the called party). For example, the called party may have specified certain content, or sources from which content may be retrieved, for presentation to someone when a call is established or is being initiated to him. Similarly, the caller may have identified content that may be displayed to the called party, in which case he may be considered the call controller for the called party's side of the telephone connection.

Figure 8:
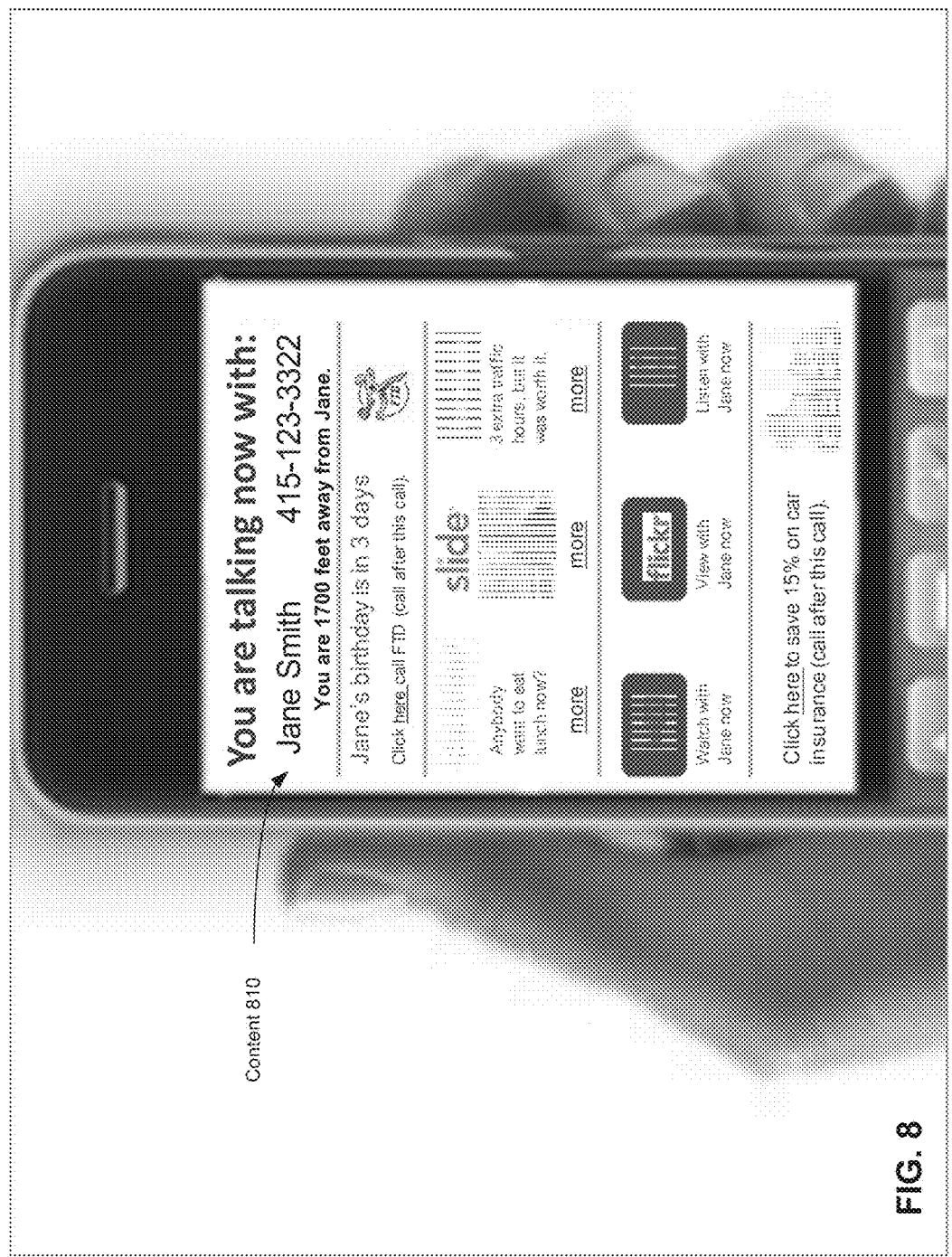

FIG. 8 further illustrates content that may be presented to a caller or called party in association with a telephone call, according to some embodiments.

Content 810 of FIG. 8 not only identifies the other party to a current call, but also includes content drawn from an electronic presence of the other party (or a third party), such as content from LinkedIn®, Facebook®, Twitter™ and/or other web sites or content repositories. Yet other content may be accessed by either or both of the parties to the call, by activating an appropriate control within content 810 to open a YouTube video, view a photo at Flickr, listen to some audio, etc.

Content 810 may also provide personal information about the other party (e.g., her upcoming birthday), her approximate location (e.g., 1700 feet away), her status (e.g., in a meeting, dining, in transit).

An advertisement included with content 810 may be relevant to another portion of the content (e.g., a birthday announcement, a discussion of traffic, an invitation to dine), and/or may be associated with one or both of the parties' current locations (e.g., as reported by a GPS component of a party's telephone).

A call controller responsible for presenting content (or determining content to be presented) to a caller or called party in the call of FIG. 8 may be the other party, a call server, or some other third party (e.g., the source of the advertisement).

As seen in FIGS. 3-8, pre-ring, in-call, and post-call content presented to a caller or called party may relate to any of the parties to a call and/or a third party. The content may include entertainment for one or more of the parties to enjoy before, during, and/or after the call but may also (or instead) include commercial information (e.g., sales offers, transaction details, advertisements, coupons). Commercial content presented to a party engaged in a call with an organization may be associated with that organization, a competitor, an associate, or an unrelated entity.

Content may include various controls for accessing additional content (alone or in unison with the other party to a call—as shared content, for example), for navigating to a party's page or presence at a particular web site, for affecting the voice channel of a call (e.g., to delay or reschedule a call, to leave a message, to add another party to the call), for accepting or viewing further details of an advertisement, and so on.

Some controls and actions offered via content presented on a party's communication device may involve altering the routing of a current call. For example, when a caller initiates an overseas call via a particular carrier, an advertisement or offer from a competing carrier may be presented pre-ring (e.g., to complete the call for $0.0x per minute). If the caller wishes to take advantage of the offer, he may activate a corresponding control within the presented content. Or, the offer may be presented as an offer or coupon during or after the original call.

Similarly, a caller may choose to route a call to a different destination based on pre-ring content. Thus, if a caller dials a commercial organization and an advertisement or offer from a competitor is presented pre-ring, the caller may accept or choose to investigate the offer (e.g., by activating a control within the content), in which case the destination of the call is changed before the original called party's telephone rings.

In some embodiments in which a call is controlled by a third party (i.e., not the caller or the called party), the call controller may present to one party content associated with a competitor or an associate of the other party. For example, content selected for presentation may be provided by the highest bidder for calls targeting a particular merchant or from a particular caller, or from a caller matching a certain demographic (e.g., age, sex, location, income).

In some embodiments, before or during a current call, a caller (or called party) may specify that another call should be established when the current call is terminated. If multiple follow-on calls are desired, a queue may be established (and may be viewable to that party). For example, if an advertisement or a communication from a friend/acquaintance is presented to the caller before or during a first call, he may activate an associated control to program his communication device to automatically place a follow-on call when the current call is completed.

As described previously, when a caller or called party's communication device is not capable of presenting rich (e.g., multimedia) content, pre-ring, in-call, and/or post-call content may be presented on a selected computing device. The content may be presented within a traditional browser program, within an application provided by an operator of a call server (or by some other entity), via an instant messaging program or electronic mail, or in some other manner.

Figure 9:
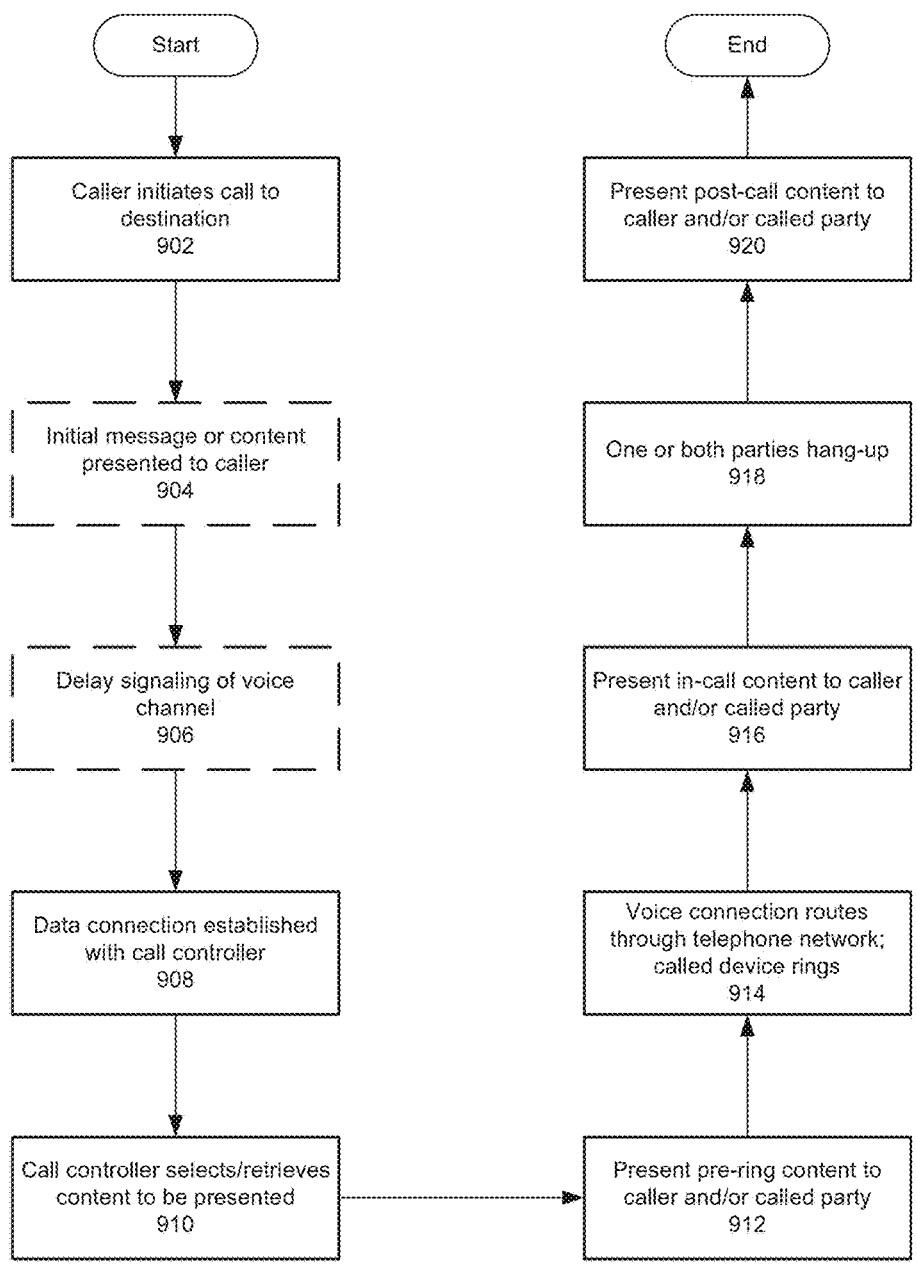
FIG. 9 is a flow diagram demonstrating the presentation of content to a caller and/or a called party in association with a telephone call, according to some embodiments.

FIG. 9 is a flow chart demonstrating a method of controlling presentation of content in association with a telephone call, according to some embodiments. In other embodiments, one or more of the illustrated operations may be omitted, repeated, and/or performed in a different order. Accordingly, the specific arrangement of steps shown in FIG. 9 should not be construed as limiting the scope of the embodiments. In the illustrated embodiments, content may be presented on a communication device or associated computing device of either or both a caller and a called party.

In operation 902, a caller initiates a call from a communication device. In some embodiments, a dialer or call processor on the caller's telephone is augmented or replaced by a dialer or call processor configured to facilitate such media presentation, or is modified to operate as described here.

A replacement or modified call processor program may be configured to immediately initiate a data connection with a call server or other controller when the caller enters the number to be dialed, when the caller selects the party to be called (e.g., from a list of contacts), or when the caller activates a control to place the call (e.g., a "dial" button"). Or, if the caller uses a search function to find a desired party by entering a partial name or telephone number, the search may be performed both on the user's device and off the device (e.g., at a call server), in which case the call controller can determine in real time that a call is being commenced.

In optional operation 904, the call processor (or other logic on the calling device) may present an initial message or content screen to the caller (if the calling device is capable of presenting such a message). For example, if the called party is known to be a friend of the caller, an initial message such as "Retrieving X's latest photo from Facebook . . . " or "Checking X's current status in WhatsApp . . . " (where X is the name of the friend) may be displayed.

Or, if the called party is known to be a merchant that has an agreement with the call controller, a commercial-oriented message may be displayed, such as "Checking for personalized offers . . . " (if the called party is a vendor) or "Retrieving details of your previous transaction . . . ," etc.

Yet further, an initial set of content may presented from local storage (e.g., a cache) on the caller's device. For example, for parties that the caller often communicates with (e.g., close friends, favorite take-out restaurants), content related to the parties (e.g., pictures, video shared between the parties, a menu) may be presented even before the call is connected. Depending on the resources of the caller's device, content related to any number of specific parties, and/or general content that may be displayed for calls to various parties, may be cached or stored on the caller's communication device.

Thus, an initial message displayed even before the caller's call is placed may comprise a logo or advertisement of a commercial business, an avatar representing a friend or acquaintance, a picture of the called party, social content (e.g., from a social networking or content sharing web site), etc. Such content may be automatically refreshed on a regular or occasional basis. In some alternate embodiments, an initial message may simply indicate that the desired call is being placed (e.g., with minimal or no content).

In optional operation 906, the voice portion of the call is delayed. In particular, in the illustrated embodiment, signaling of the call via SS7 (Signaling System Number 7) or other telephone switching scheme may be automatically delayed by a short period of time (e.g., 1 second, 5 seconds, 10 seconds) to allow a data portion of the call to be established between the calling device and a call controller. As described above, the call controller may be a call server, a telephone agent (automated or human), an operator, or other entity.

A default period of delay may be increased or decreased based on an identity of the caller or called party, or the time necessary to collect and present appropriate content, and different delays may be associated with different parties. Yet further, once the data connection is established with the call controller (e.g., in operation 908), the calling device may be instructed to extend the delay or to reduce or eliminate any delay.

For example, if the call is being placed to a particular friend or acquaintance, and it is known that no relevant content is available regarding that person, the delay may be negligible. Alternatively, if the call controller is able to quickly determine that an electronic presence of the called party has recently changed (e.g., at a web page on Twitter™, WhatsApp®, LinkedIn®, Facebook®, YouTube®, Instagram®, or MySpace®), a delay may be lengthened to allow that page (or a portion thereof) to be retrieved and served to the calling device.

As another example, if the call is being placed to an unknown party, no content specifically relative to that party will be identified, and so there may be little or no delay. Alternatively, if the called party is a known commercial entity, the call controller may implement a delay sufficient to allow identification, retrieval, and serving of relevant content—such as details of a previous transaction, a status of a current transaction, a customer service request, an invoice, an advertisement from a competitor, a special deal, a guide to an IVR (Interactive Voice Response) menu of the called party's telephone system, etc.

Voice connections to some telephone numbers (e.g., 911, 411, 0), to friends and acquaintances (e.g., private individuals within the caller's contact list), or to numbers matching certain patterns (e.g., anything less than seven digits, anything more than ten digits, anything with a * or # symbol) may be initiated without delay or may otherwise be treated in a special manner.

In operation 908, a data connection between the caller's communication device and the call controller is established, and the call controller receives the origination telephone number, the destination telephone number and any related information (e.g., names of caller and called party, an indication of a frequency of contact between the parties, details of a previous call between the parties, content the caller wishes to share with the called party).

In some embodiments, the call controller is an agent associated with either the caller or the called party, especially when that party is (or represents) a company or other organization. Thus, presentation of content in association with calls placed to some organizations (e.g., large commercial companies) may be controlled by an agent that works for that organization. In these embodiments, the call controller can present to the caller special deals (e.g., sales, personalized offers, upgrades), details of a previous or current transaction between the caller and the organization, visual information regarding the organization or a product or service the organization offers (e.g., pictures, one-way or two-way video, graphics), etc.

In other embodiments, a call controller may be a third party (e.g., the caller's or called party's telephone service provider, an operator of a call server). A third party controller may control presentation of content related to either or both the caller and called party, and/or may present content relating to a different party. For example, a third party call controller may present to a caller an advertisement for a competitor or affiliate of the called party, or present to the called party an advertisement for a competitor or affiliate of the caller.

A call controller may establish agreements with commercial (and/or other) entities to present their selected content (e.g., advertisements, special offers) to certain callers and/or called parties based on their identity or the identity of a party to which they would be connected to if the current call is completed. The content to be presented may be selected at random, or may be based on an identity or profile of the caller or the called party.

In particular, a call controller (especially a third party call server) may auction or otherwise sell content presentation opportunities to advertisers or other entities. The call controller may differentiate content presentation opportunities based on the caller and/or called party identities, geographical location of a party, party demographics, and/or any other characteristic.

Also in operation 908, the call controller may quickly attempt to ascertain a status of the called party. For example, by making (or attempting to make) a data connection to the called party's communication device, the call controller may determine that the called party is available, is on a call (and maybe an identity of the other party), is in a meeting or is otherwise unavailable, possibly due to a communication failure or an emergency. Illustratively, such a status may be determined based on a status of the communication device (e.g., off-hook) or by a status set on the device by the called party (e.g., to forward call, to initiate a silent mode of operation).

If the called party is unavailable, the caller may be offered the option to wait, to call later, to leave a message, to have the called party place a return call the caller, to automatically place a call from the caller to the called party when he/she is available, etc.

The call controller may also determine whether the communication devices of either the caller or called party are incapable of presenting content, in which case any content selected for presentation to that party may be presented on an associated computing device (if one has been identified).

Once the call controller learns the identities (or telephone numbers) of either or both the caller and the called party, it may block or allow the call based on a global block/allow list maintained at the call controller. For example, if the caller is a known telemarketer or spammer (or some other type of undesirable caller), or perhaps even a suspected telemarketer, and the called party has opted to have calls from such sources blocked, the call controller may block the presentation of content to the called party and may even prevent the voice connection from being completed.

In operation 910, the call controller selects content to be presented to the caller and/or called party, retrieves it from an internal database or from an external location, or otherwise causes it to be transmitted to the desired party or parties. To select content for presentation, the call server may consider personal characteristics (e.g., age, sex, geographic location), behavior (e.g., browsing history, calling history, buying pattern) and so on, of the caller and/or the called party.

The call controller may also consider whether the caller or called party is known to have a personal web page, a page on a social networking or dating site, or some other electronic presence that can be accessed and that can be shared with the other party. Illustratively, subscribers may give permission to a call controller to access certain electronic information and present it to all or selected parties. Thus, friends and family members can specify that their electronic content on certain sites can be shared with certain people (or all parties) with which they communicate.

Content may be presented to either party pre-ring (i.e., before the called party's communication device rings), in-call (i.e., during a call), and/or post-call (i.e., after one or both parties hang up). The call controller may identify and/or retrieve content to be displayed in all phases at once, or may identify/retrieve content separately for the different phases. Information necessary to select appropriate content (e.g., identities of the caller and called party) may be received via the data connection—in the form of the parties' telephone numbers or network addresses (e.g., for VoIP calls), for example.

Content to be presented to a party may change over time, or be replaced. For example, if one of the parties updates a page of personal electronic content (e.g., on a social network site), that page or the changes may be automatically shared with the other party. Or, as a call with a commercial entity proceeds, presented content may be updated to reflect an order that is being placed for a good or service, to verify terms of a transaction, to provide assistance or reflect assistance that has been provided, to provide payment options, etc.

In operation 912, pre-ring content (i.e., content to be presented before the destination communication device rings) is transmitted to the caller and/or the called party via data channels, for display or presentation to their operators/users.

In some embodiments, pre-ring content presented to a caller or called party comprises information that the call controller believes the party may be able to use or wish to see during the call. For example, if one party is an organization, the other party may be shown location information regarding the organization (e.g., the nearest shop or outlet of the organization), a profile or description of the organization, details of a previous or pending transaction with the organization, the status of an account with the organization, an offer from a partner or affiliate of the organization, an offer from a competitor of the organization, a purpose of the call, a notification of the call, etc.

If the parties are friends or acquaintances, one party may be shown content drawn from a social networking site or other electronic presence of the other party (e.g., a photograph, a video), content shared between the parties, status information of the other party or a mutual friend/acquaintance, etc.

Thus, pre-ring content presented to a caller or called party may be associated with the other party and/or a third party (e.g., a competitor of one of the parties to the call, a mutual friend or relative of the caller and the called party). Further, the called party may be offered the opportunity to postpone or reschedule the call for a later time.

In operation 914, the voice channel of the call is routed normally (e.g., through the telephone network of the caller's service provider), and a communication device of the called party rings.

In operation 916, after the called party answers, in-call content (i.e., content presented during the call) is transmitted to one or both parties' communication devices (or associated computing devices) for display to the caller and/or the called party. In-call content may be the same as, or different from, pre-ring content.

For example, if one party is a merchant, the other party may be presented with information regarding a current transaction with the merchant, possibly to verify what is being ordered, a delivery address, a method of payment, or other detail. This data may be updated dynamically as the call progresses. Or, if the caller and called party are collaborating on a document or other electronic product, some or all of that content may be displayed.

Yet further, one of the parties may select content stored on his or her communication device, or navigate a browser on their device to some content, and elect to share that with the other party. The call controller or a call server would then ensure the other party is able to access the content. Content may be shared in this manner before, during, and/or after a call. Even without an associated call, one party may be able to transmit data or content to another party via the system described herein, for off-line presentation to the other party.

One benefit of presenting in-call content is that a caller and a called party can engage in simultaneous data and voice connections. Although the voice connection will couple the caller and called party (and any other parties conferenced in), the data connection may couple each party to a call server or a call controller. They may therefore discuss and share electronic content in real-time.

If the call is not answered in operation 916, the caller may be able to leave a voice or message for the called party.

In operation 918, one or both of the parties hang-up, thereby terminating the voice channel of the call.

In operation 920, additional (post-call) content may be presented to either or both of the caller and the called party. Post-call content may verify a decision made during the call, provide a party with follow-on tasks (e.g., make a call to another party, view a web page associated with the other party), etc. Or, post-call content may be identical or similar to pre-call and/or in-call content.

In some embodiments, a person (or organization) may construct or design a custom set of content to be presented to another party before, during or after a call to (and/or from) that party. The content may be static in that it comprises content that is selected once and does not change unless/until the person changes the content. Or, the custom content may comprise links to content or content sources that may change over time—such as the person's (or organization's) LinkedIn®, YouTube®, Instagram®, MySpace® or Facebook® page (or a particular frame of such a page). As the content changes, the updated content will be captured and presented to other parties as allowed by the originating party (e.g., limited to friends and family, displayable to all parties).

For example, a person may assemble a personalized hello screen or page (for playing pre-ring or in-call) or a personalized goodbye screen (to be played after a call). Other personalized screens may be configured to be presented to another party in the case the person cannot take a call—such as one screen if the person is busy, and a different screen if the person is away from her phone—or for other reasons.

Such personalized content may include controls for taking some action. For example, if a called party is busy and cannot take the caller's call immediately, personalized content may be presented to the caller with a control that helps the caller navigate to the called party's social network web page, to an online calendar for making an appointment or seeing when the called party will be available for a call, etc.

A call server or other entity may provide a web server or other online service to assist a subscriber in the creation and maintenance of a personalized page or screen of content to be presented to another party when the subscriber calls (or receives a call from) the other party. This service may be independently operated or may be hosted by another online presence, such as Twitter™, Skype®, FaceTime®, Snapchat®, WhatsApp®, LinkedIn®, YouTube®, Instagram®, MySpace®, Facebook®, etc.

Other parties, particularly organizations, may develop custom pages or screens independently. Custom screens may be cached on a call server, stored with a call controller, or maintained elsewhere (e.g., in the organization's data center(s)) in anticipation of being retrieved for presentation. In some embodiments, a party's custom screen may be indexed by telephone number, by an identity of the party (e.g., name) and/or in another manner.

In addition to, or instead of, identifying or constructing default custom content to be presented to another party in association with a telephone call with that party, a person (or organization) may construct or select a simple pre-ring message to be presented to a targeted party. As described above, for example, a caller may issue a pre-ring message identifying a purpose for the pending call.

Before, during, after, and between calls, a party may push images, video, and/or other content to another party (e.g., an electronic contact or business card, an electronic birthday card, a shipping address or billing address, payment data, a receipt). Further, parties to a call may simultaneously access content located on one of the parties' devices or elsewhere.

Figure 10:
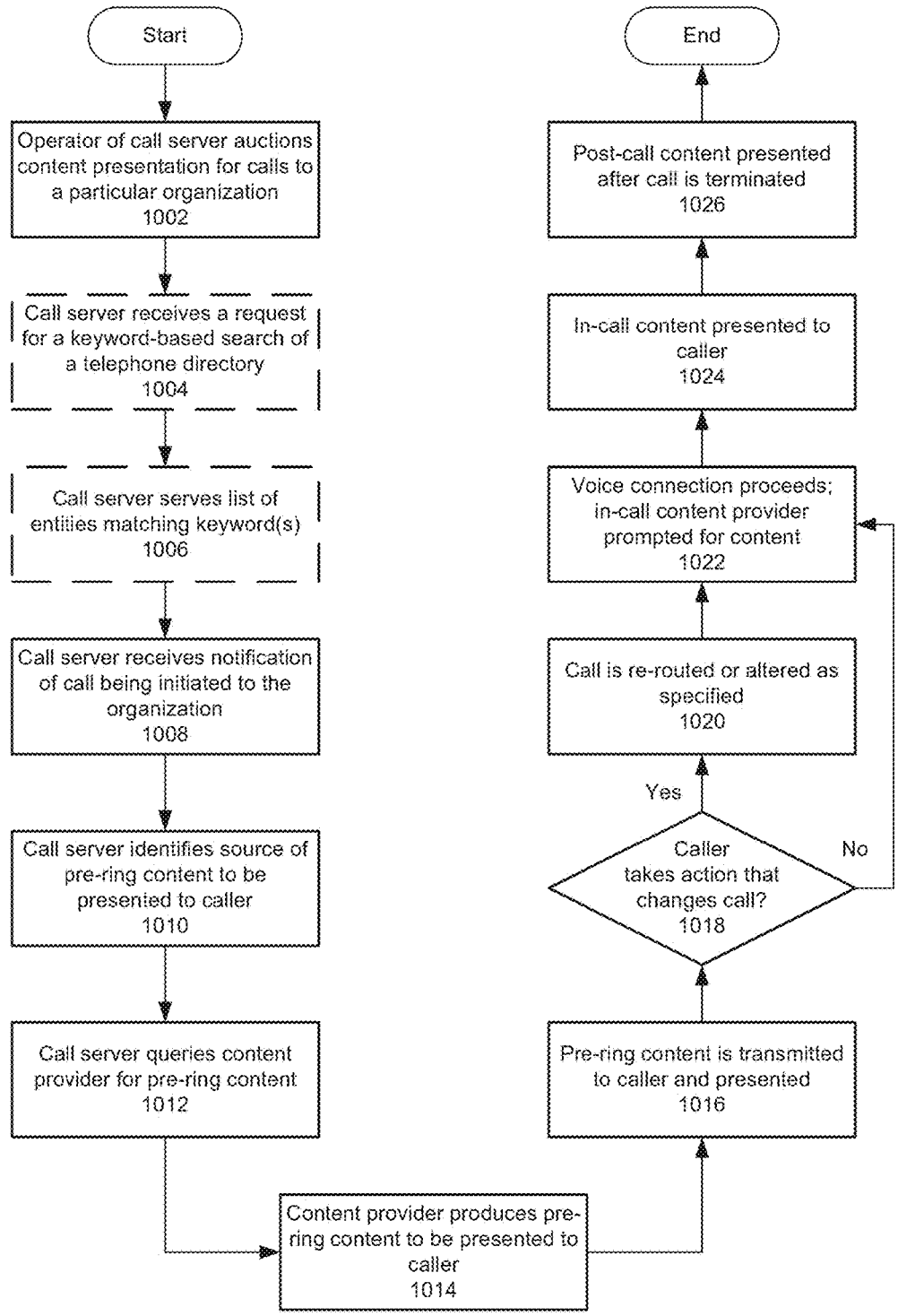
FIG. 10 is a flow diagram demonstrating the presentation of content to a caller in association with a telephone call, according to some embodiments.

FIG. 10 is a flow chart demonstrating a method of presenting relevant content to a caller in association with a call to an organization (e.g., a merchant), according to some embodiments. In other embodiments, one or more of the illustrated operations may be omitted, repeated, and/or performed in a different order. Accordingly, the specific arrangement of steps shown in FIG. 10 should not be construed as limiting the scope of the embodiments.

In operation 1002, an operator of a call server accepts bids for the opportunity to present content to persons calling the organization. In particular, third parties (and/or the organization itself) may bid an amount they are willing to pay the call server in return for the call server presenting the third party's selected content to some number of callers that initiate calls to the organization.

This operation may be part of a larger effort in which the call server auctions the ability to present content to persons that will call (and/or be called by) various organizations. In different embodiments, content selected by the winner of an auction may be cached on a call server, may remain with the winner or may be cached elsewhere (e.g., an ad server). The call server may auction different call types separately—such as calls from different geographical areas, calls from callers matching different demographics, calls to a specific subset of the destination organization's telephone numbers, calls grouped according to temporal characteristics, etc.

Because content may be presented to a caller pre-ring (before the destination party's telephone rings), in-call (during the call), and/or post-call (after the call), different parties (or the same party) may earn the right to have their content presented at different times. Thus, one party may supply pre-ring content while other parties present in-call and post-call content. Or, one party may win the right to supply multiple stages of content in association with one call.

Further, multiple parties may obtain the opportunity to present content at the same time. For example, one type of content (e.g., pre-ring content) may be configured to comprise two (or more) components or frames, and each component may be populated by a different source.

In some embodiments, a party (e.g., the organization) may obtain the ability to directly control the presentation of content on the caller's communication device at some phase, especially during and/or after the call. Thus, while a different party, such as a competitor of the organization, may serve pre-ring content for a caller, once the call is connected to the organization, the organization may be able to dynamically select and present content to the caller.

In optional operation 1004, the call server receives a destination telephone number lookup request from a caller's communication device (e.g., telephone). More specifically, in the embodiments reflected in FIG. 10, a caller may initiate a keyword-based lookup of a destination telephone number. The keyword received in operation 1004 may or may not match the organization identified in operation 1002.

To perform a search, the caller may enter a portion of the name of a desired destination by spelling it out with his telephone's keypad, by speaking it into the telephone's microphone, or via other means (e.g., a braille or haptic device). That input may be used (and converted to text as necessary) to lookup matching parties locally (i.e., on the caller's communication device) and/or globally (i.e., on a call server or other location external to the caller's communication device).

It may be noted that a keyword-based search may involve searching for specific people and/or organizations having names that match a caller's keyword. Or, a keyword may identify a category of a good or service the caller desires (e.g., pizza, taxi, hotel, Chinese food), in which case the results will include parties that can provide the desired good or service.

Thus, if the caller enters several letters of a merchant's name or category of good (e.g., "h e r t", "m a r r i o", "p i z z"), searches may be initiated for people and/or organizations that match the keyword or input pattern. A search may return any number of results (zero or more), depending on how many characters are input, whether the caller is spelling the name correctly, how many telephone numbers are associated with parties that match the keyword, etc.

In some embodiments, the call server may auction or sell priority positions in keyword search results. Specifically, a party matching a keyword pattern (or even a party that doesn't match the pattern) may pay the call server to receive premium treatment in a list of search results served to the caller (e.g., by being placed at the top of the list, by receiving an entry having a larger size, a different color, or other highlighting).

If multiple telephone numbers are found for a given party that matches the keyword(s), they may be ordered in some logical fashion. Thus, a local or toll-free number for the party may be prioritized higher than a long-distance number, an IP address for a VoIP call may be prioritized higher than a telephone number (or vice-versa), a matching party that the caller has called before may be prioritized above one that he or she has not called before, etc.

Of note, a search or directory lookup initiated by a caller in operation 1004 may simultaneously or sequentially search the caller's local communication device and a call server (and/or a third-party directory), with only a single command or control activation. Thus, the caller can initiate a search of multiple data repositories, local and/or remote, with a single command.

Besides searching a person's contact list on their local communication device and/or a central call server (or call controller), a directory lookup or contact search may also search contact information stored in the person's electronic online presence. Thus, contact information within the person's page on LinkedIn®, YouTube®, Instagram®, MySpace®, Facebook® or other social site may be searched. Yet further, a search may be conducted within a third-party data repository, such as an online yellow pages, a university's or other organization's telephone directory, a commercial database, etc.

In optional operation 1006, the call server serves a list of search results. The results may be ordered alphabetically, by popularity or some other rating, by location (e.g., distance from the caller or a fixed point (such as a set of GPS coordinates)), by payments received from parties in the list, by temporal characteristics, etc. A list of results provided by the call server may be merged with a list of results generated by the caller's communication device.

In operation 1008, the call server is notified of a call being placed to the organization. Illustratively, the caller may have initiated the call by selecting or activating an entry within the list of search results received in operation 1006, or may initiate the present call at some later time. Notification of the call may be received via a data channel (or data channels) hosted by the caller's communication device.

Alternatively, the notification may be received via a data connection with the caller's telephone service provider. This may occur if the caller's communication device does not have a data channel or is not capable of presenting rich content.

Routing of the caller's voice connection may be automatically delayed by the caller's communication device or by the caller's telephone service provider. For example, the destination organization may be recognized as a commercial entity, and call processing logic on the caller's device (or at the caller's service provider) may be configured to delay calls to commercial organizations (or selected commercial organizations) so that appropriate content can be selected and presented to the caller.

In operation 1010, the call server identifies a source of pre-ring content to be presented to the caller, based on the destination telephone number (i.e., the organization), the caller's identity, the caller's location and/or other factors. Based on the auction of operation 1002 for example, the call server may be configured to serve content provided by the winner of the auction to the next X number of callers that place calls to the organization, or to callers matching one or more criteria.

In operation 1012, the call server queries the content provider for the pre-ring content. Alternatively, such content may be pre-identified, in which case the call server may automatically retrieve it.

If the pre-ring content must be retrieved from the content provider, the call server may provide information regarding the caller (e.g., telephone number, name, demographic data). Such information may be used by the content provider to select particular content; for example, the content provider may wish to present different content to callers that it "knows" than to unknown callers. Therefore, if the caller has a relationship with the content provider, the content provider may produce content comprising a different offer, advertisement, or other message.

In operation 1014, the content provider submits pre-ring content to the call server that it would like to have presented to the caller or, alternatively, identifies a location (e.g., URL, network address) from which the content may be retrieved.

In operation 1016, the call server transmits the selected pre-ring content to the caller's communication device, and call processing logic (or other logic) operating on the device presents the content to the caller. Alternatively, browser logic (or other logic) operating on the communication device may be instructed to retrieve the content from one or more specified locations. For example, the pre-ring content may comprise one or more components stored in one or more locations, and the browser logic may be responsible for retrieving the components, assembling them, and presenting the content.

As described previously, if the caller's communication device is incapable of receiving or displaying the content, the content may be presented on a computing device associated with the caller.

In operation 1018, the caller's communication device (or computing device) or the call server determines if the caller takes some action with regard to the pre-ring content that affects routing or processing of the voice connection.

For example, the pre-ring content may include an offer from a competitor of the organization, or an offer to route the call more cheaply, and the caller may activate a control associated with such an offer. The action may thus simply affect how the voice connection is routed, or may change the destination of the call. If the call is modified by the caller's action regarding the pre-ring content, the method continues at operation 1020; otherwise, the method advances to operation 1022.

In operation 1020, the call server or logic operating on the caller's communication (or computing) device implements the desired action. Thus, a call processor on the communication device may drop or cancel the current voice connection (which may not have been dialed yet) and select a new telephone number to call.

Note that if the call destination has changed (e.g., to a different organization), a different party may become responsible for providing content to be presented in-call and/or post-call.

In operation 1022, the voice portion of the call proceeds, either to the original destination or a new one specified by the caller in operation 1018. In addition, the call server queries or prompts the appropriate content provider for in-call content.

In an embodiment in which control of in-call content presentation completely passes to a call controller (content provider) other than the call server, such as the destination organization, such control may be passed in operation 1022. Specifically, once the call is confirmed to be destined for a particular organization, the organization may become the call controller for in-call and possibly post-call content as well.

In operation 1024, in-call content is presented to the caller on his communication (or computing) device. As already described, the content may be served from the initial call server (after being identified by a responsible content provider), by the selected content provider, or directly from an assigned call controller.

Even if a call controller separate from the call center has acquired control of in-call content presentation, such content may still transit a data channel established between the caller and the call server. Or, alternatively, the data channel may be re-routed to the call controller.

The in-call content may directly relate to the call, especially if the content is produced by the called organization. For example, if the in-call content is controlled by a human agent of the called organization, she may supplement information exchanged over the voice connection with audio, textual, and/or video data presented via the caller's telephone or computing device.

In operation 1026, post-call content is presented to the caller after he and/or the called organization hang-up. Such content may be produced by the called organization and/or by some other party that earned the right to have its content presented.

Post-call content may directly relate to the call (e.g., a receipt, an invoice, a transaction summary), may be unrelated, or may have some logical association—such as an offer for a good or service that complements (or competes with) something the organization sells or provides.

In some embodiments, pre-ring, in-call, and/or post-call content presented to a caller or a called party may include one or more coupons. In these embodiments, a coupon may comprise a graphical image of a coupon, a discount code, or any other textual or graphical display that grants the recipient a discount in purchase price or a special deal (e.g., one item free with the purchase of another item). An entire (or partial) image of the coupon may be presented, or just a link to the coupon may be presented (e.g., "Press here for a 25% off coupon!").

A coupon may be redeemed during a telephone call associated with the presentation of the content or at some later time. Call processor logic, coupon logic, or other logic operating on the recipient's communication (or computing) device may be configured to save coupons, at least until their dates of expiration. Coupons may also, or instead, be saved for a user at a call server, such as in a "coupon account" associated with the user by name, telephone number, or some other identifier.

A coupon database for storing coupons for award or presentation to users may be indexed or sorted by telephone number and/or name of the corresponding merchant, and may reside at a call server or a third party. Then, when a caller initiates a call to one of the telephone numbers or merchants, one or more coupons matching the target called party may be retrieved and presented.

Further, a coupon for a given merchant may be associated with a telephone number of a competitor or a merchant of an associated good or service, in which case a caller may not receive coupons only for the merchant that it intended to call. A set of coupons identified for presentation to a caller may be filtered by relevance, perhaps in consideration of the merchants' proximity to the caller, the time of day (e.g., in case some merchants are closed), etc.

A coupon may be presented pre-ring based on the telephone number being dialed or an identity of the target party. Or, in response to a directory lookup (e.g., based on a keyword) performed on a call server, a coupon may be served for an organization included in the list of results (or for a competitor of such an organization). Thus, if a caller enters a lookup for the keyword "pizza," along with a list of pizza vendors (possibly identifying their proximity to the caller), one or more coupons may be presented.

Along with presentation of a pre-ring coupon, a control for routing or re-routing the call to the offeror may be provided. If activated, the coupon (or notification of the coupon) may be passed to the offeror along with the call.

In-call presentation of a coupon may be triggered not only by a call server or call controller selecting such content to be presented to the caller, but may also be triggered based on coupons stored for the user—either locally on her communication device or centrally in the "coupon account" mentioned above. Thus, after a voice connection is completed to an agent for a particular merchant, the caller may be reminded of (e.g., shown) a coupon she possesses for the merchant. She can then pass to the agent a code within the coupon or perhaps activate a control that transmits the coupon to the agent.

As for post-call content, after a caller completes a call with a merchant, post-call content may include a coupon for use the next time the caller calls or visits the merchant. A post-call coupon may be saved automatically or manually.

A coupon presented to a caller (or called party) in association with a telephone call may include a limitation on how or when it may be redeemed. For example, a coupon for a lunch meal may only be good until 6:00 pm the same day. Another coupon may be valid until sometime further in the future. Similarly, a coupon may be limited to a specific area. For example, a particular coupon may only be good at a specific store or at a merchant's locations in a particular area code, city or state.

Yet further, a coupon may be limited to certain recipients. For example, a particular coupon may only be redeemable by members of a specific group (e.g., frequent fliers of a given airline, account holders at a given business), people meeting specified demographic and/or psychographic requirements, subscribers to a particular telephone carrier, etc.

To prove his qualification to use a certain coupon, a caller may be required to provide an account number or to manipulate his telephone to transmit a copy of a contact card evidencing his qualification. Alternatively, the caller's telephone number (e.g., via callerID) could be used to verify the caller's identity.

If a person's communication device is unable to display an electronic coupon, it (or a link to the coupon) may be displayed on an associated computing device.

As described above, a caller may initiate a search of contacts or one or more telephone directories from his communication device. In some embodiments, the caller merely needs to begin spelling a name of the desired destination. Each character that is entered is appended to any preceding characters and submitted to any local directories (e.g., a contact list on the communication device), as well as other repositories on a call server, an online telephone directory, an organizational contact list, etc.

Thus, as each character is entered, any number of contacts may be identified and used to populate a list presented to the user on the communication device. The list may shrink as the search becomes more specific and the number of matching contacts decreases, and some or all entries may be accompanied by controls the user can actuate to initiate a call to the corresponding destination.

As more and more callers generate searches and select their desired destinations, a call server (or a third party) can analyze statistics and trends to identify the specific destination parties that are most likely to be matches for a given sequence of search characters. This data may be used to refine the manner or sequence in which matching destination parties are presented.

In some embodiments, off-device contact lists or repositories may be shared among multiple users. A shared list may be updated by any or all of the participating users or by an authorized subset of the users, who may be relatives, friends, members of an organization, classmates, etc. Thus, an update to a shared list submitted by one participant can be automatically shared among all participants.

Entries may, however, be screened or filtered according to a particular participant's desires. For example, a given participant may not wish to share a particular contact with other participants, or may not wish to see specific contacts that were added by another participant (e.g., contacts that the given participant does not like).

A shared contact list may be stored at a call server or other central site and may be automatically searched when a list participant initiates a search from her device. In addition, some or all contacts from a shared list may be automatically copied to a participant's local device or a computing device (e.g., for synchronization with an address list stored on the device).

Figure 11:
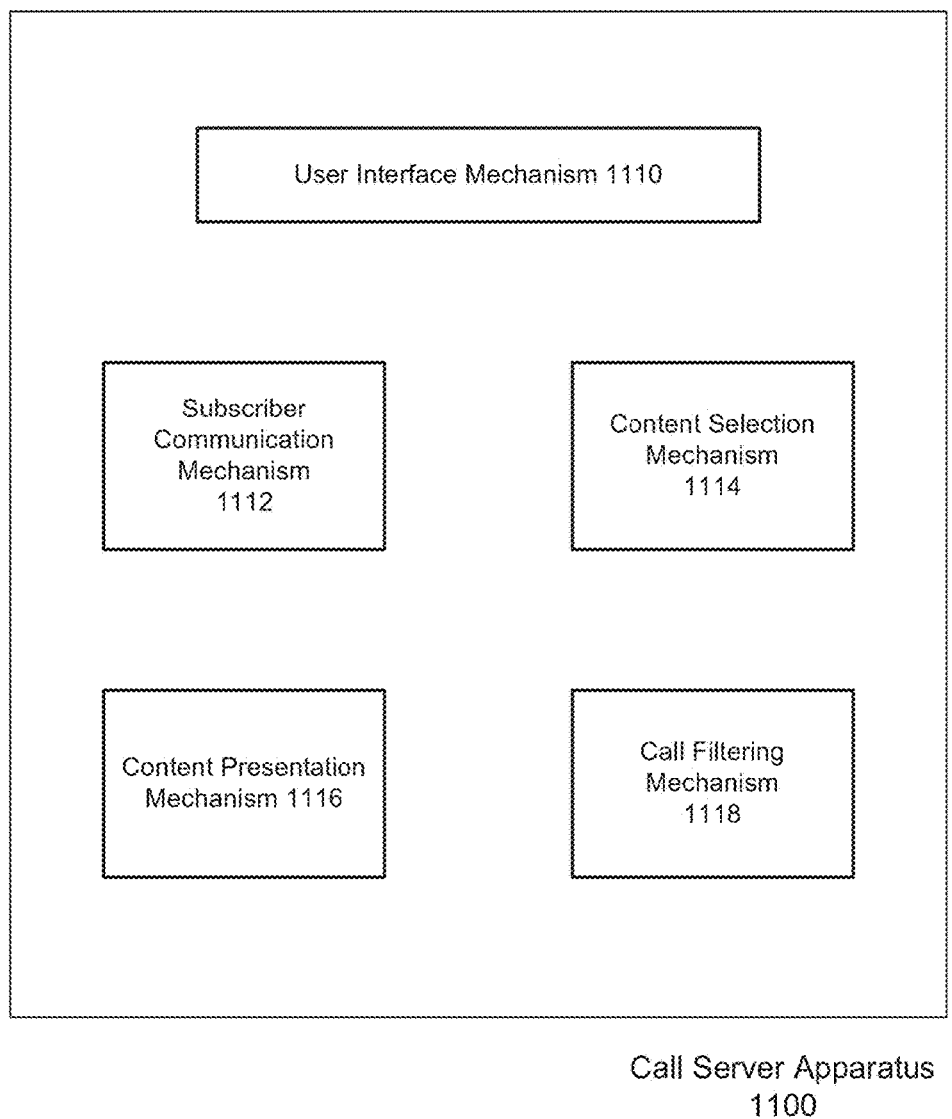
FIG. 11 is a block diagram of hardware apparatus for facilitating presentation of content in association with a telephone call, according to some embodiments.

FIG. 11 is a block diagram of hardware apparatus for facilitating presentation of content in association with a telephone call, according to some embodiments.

User interface mechanism 1110 of call server apparatus 1100 is adapted to facilitate computing interaction between the call server apparatus and subscribers (e.g., callers, called parties), and possibly third-parties (e.g., advertisers, content providers, call controllers).

Illustratively, a subscriber may manipulate the user interface mechanism to configure his or her profile, to register a computing device on which content may be presented instead of a particular communication device (which may be identified by telephone number) that cannot present rich content, and so on. An advertiser or content provider may manipulate the user interface mechanism to identify (or upload) content to be presented to a subscriber, to bid on the right to present content, etc.

Subscriber communication mechanism 1112 is adapted to host data connections between the call server apparatus and communication devices (and/or computing devices) of callers and/or called parties, in association with a current, pending, or past voice connection between the parties or with an authorization by one or more of the parties to initiate a voice connection. Thus, mechanism 1112 may be the component that learns of the initiation of a new telephone call and that receives the caller's and called party's telephone numbers.

Content selection mechanism 1114 is adapted to select a source of content (or to select specific content) to be presented to a caller or called party pre-ring, in-call, and/or post-call. Mechanism 1114 may select content or a content source based on the parties to the call, such as a content provider that has paid a fee in order to have its content presented. Or, if non-commercial content is to be presented (e.g., in association with a call between friends), the identified content or content source may relate to an online presence of either or both parties.

Content presentation mechanism 1116 is adapted to transmit content to a caller and/or a called party in some embodiments. In embodiments in which the content is transmitted from a different entity (e.g., a content provider, a call controller operated by a commercial organization), content presentation mechanism 1116 and/or content selection mechanism 1114 may cooperate with the entity to arrange for the transmission of the content. Or, control of the presentation of content may be handed off to an assigned call controller in place of content presentation mechanism 1116.

Call filtering mechanism 1118 is adapted to filter calls based on any desired criteria. For example, calls (or data transmissions) that are inbound to a subscriber may be filtered based on the originating number, to block calls from telemarketers, spammers, and/or other undesirable parties.

In other embodiments, functions performed by the various mechanisms may be distributed among a different number of mechanisms.

Figure 12:
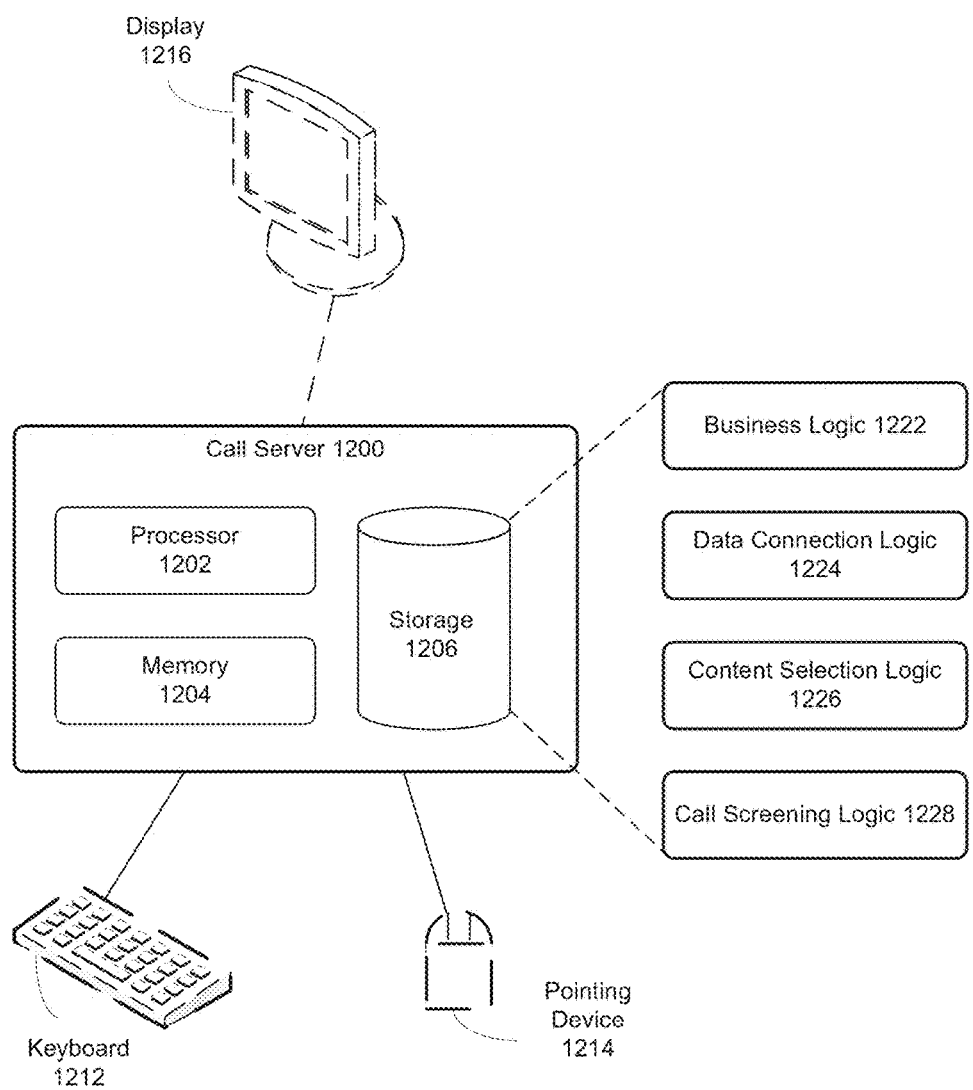
FIG. 12 is a block diagram of a call server for facilitating presentation of content in association with a telephone call, according to some embodiments.

FIG. 12 is a block diagram of a call server for facilitating presentation of content in association with a telephone call, according to some embodiments.

Call server 1200 of FIG. 12 comprises processor 1202, memory 1204, and storage 1206, which may comprise one or more optical, solid-state, and/or magnetic storage components. Call server 1200 may be coupled (permanently or temporarily) to keyboard 1212, pointing device 1214, and display 1216.

Storage 1206 of the call server stores logic that may be loaded into memory 1204 for execution by processor 1202. Such logic includes business logic 1222, data connection logic 1224, content selection logic 1226, and call screening logic 1228. Additional logic may be stored and executed in other embodiments.

Business logic 1222 comprises processor-executable instructions for auctioning or selling an opportunity to have content presented to communication devices (and/or computing devices) in association with a telephone call, or for otherwise generating revenue in return for presenting content to callers and/or called parties.

Data connection logic 1224 comprises processor-executable instructions for establishing, maintaining, and terminating data sessions with communication and/or computing devices, to receive notification of call events, serve content, retrieve content from a party's communication device, etc.

Content selection logic 1226 comprises processor-executable instructions for selecting a source of content, or specific content, to be presented to a party to a telephone call. If presentation of content is to be controlled by an entity other than call server 1200, content selection logic 1226 (or another component of the call server) may select a call controller to manage the content presentation.

Call screening logic 1228 comprises processor-executable instructions for filtering, screening, and blocking calls placed to (or from) a subscriber. Calls may be blocked (or allowed) based on an identity of the other party or the nature of the call (e.g., spam, telemarketing, adult content).

Payment Information Associated with a Telephone Call

In some embodiments, one or more payment mechanisms are implemented in association with a telephone call or other communication connection. Additional payment information may also be provided, such as details of a transaction for which payment is being made, a receipt, user authentication/verification, etc. The additional payment information may be provided with the payment mechanisms, beforehand or afterward.

In these embodiments, a payment effected using an electronic mechanism may be necessitated by or at least related to the call. For example, during a call the caller (or a called party) may express an interest in purchasing something, and the payment information/mechanism process may be triggered by the same party or by another party to the call (e.g., a merchant, a payee, a payment processor). In this scenario, one or more payment mechanisms may be presented to the payor (which could be either a caller or a called party) during or after the call (e.g., while the parties still have a voice connection or after the voice connection is terminated).

In addition, in some scenarios a party may activate a payment mechanism before a call or without any voice call being established. For example, a caller may call a specified telephone number associated with one or more payment mechanisms, a payment processor that offers at least one mechanism, or a merchant or vendor that will receive proceeds of the payment. The caller may use one or more available mechanisms to pay a bill, make an installment payment, or satisfy some other existing debt before talking to a called party or even without talking to a called party or a representative of a called party (e.g., if the called party is an organization).

Alternatively, a call server, call controller, or other entity associated with a payment mechanism, payment processor, or a merchant/vendor may call a party's communication device (e.g., at a predetermined or pre-scheduled time, upon notification of a corresponding transaction or debt) and offer the payment mechanism to allow the called party to make a payment.

It will be understood that references to parties engaged in a call encompass the entity that initiated the call and any entity that received the call. An "entity" may therefore be an individual person or some kind of organization, such as a business, a government agency, a not-for-profit concern, etc. In the latter cases, the term "party" may refer to the organization and/or a person engaged in the call on behalf of the organization.

A payee or other entity that hosts, initiates, triggers, or invokes a payment mechanism may be call server 130 of FIG. 1, call controller 230 of FIG. 2, call server apparatus 1100 of FIG. 11, call server 1200 of FIG. 12, or some other computing component associated with or cooperating with an organization seeking or facilitating payment from a payor. In addition, a payor may proactively trigger or initiate a connection with such an entity using his or her smart phone, portable computing device, or some other computing or communication device.

Figure 13:
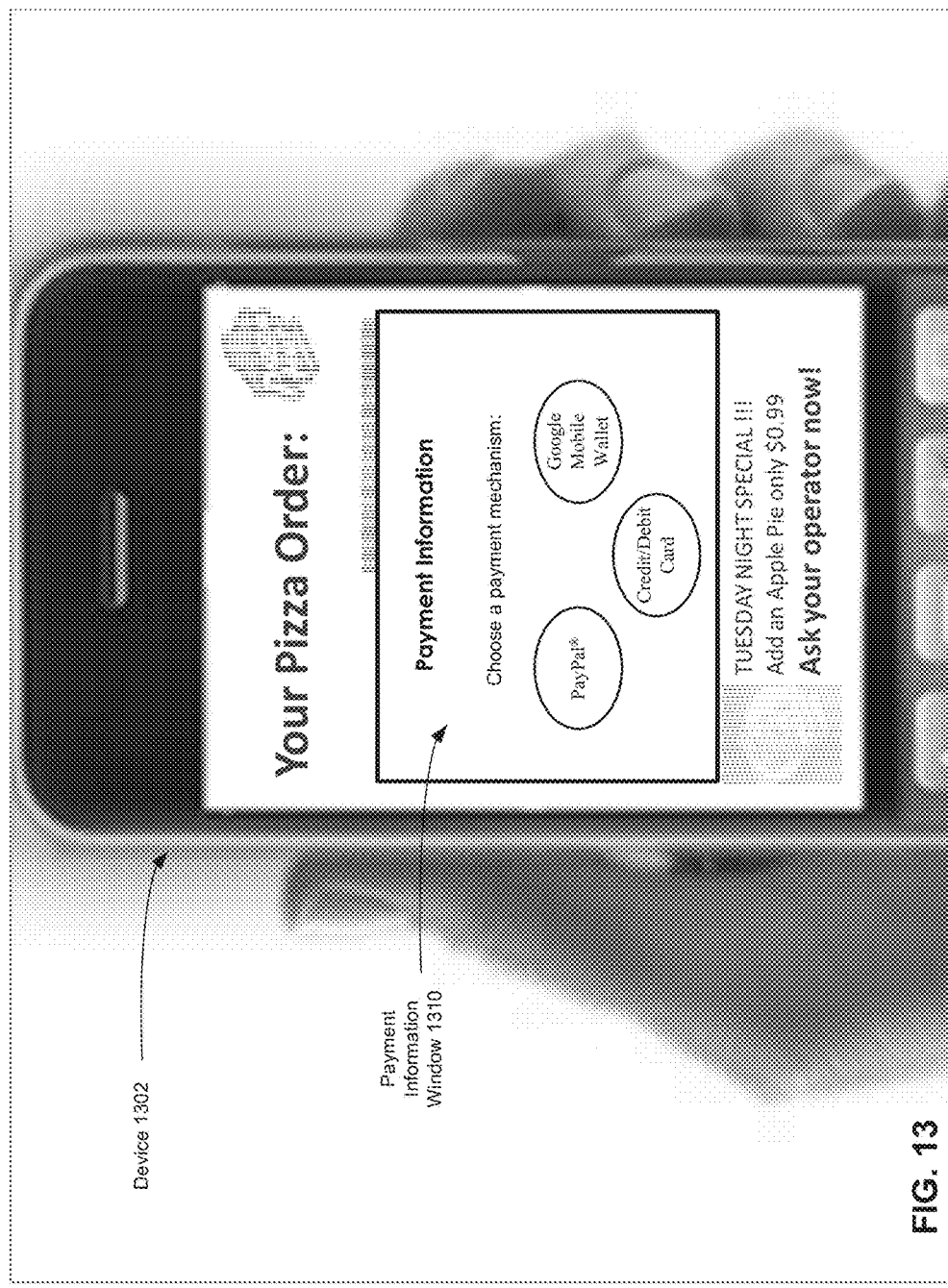
FIG. 13 depicts the collection of payment information from a payor, according to some embodiments.

FIG. 13 depicts collection of payment information from a payor according to some embodiments. In these embodiments, when terms of a transaction have been arranged—such as a pizza order—the payor may be offered any number of payment mechanisms, depending on which mechanisms the payee (e.g., a vendor, a merchant) accepts, which mechanisms are supported by the payor's device and communication service provider, which mechanisms the payor has configured on his or her device, etc. In the illustrated scenario, payment information window 1310 is displayed to offer the payor three options—PayPal®, Google Mobile Wallet, and credit/debit card. In other scenarios, any number (i.e., 1 or more) of the same and/or different options may be offered (e.g., Apple Pay®, Google Wallet™, Samsung Pay®).

Depending on the transaction, a payor may initiate payment via a selected payment mechanism before or after all details of the transaction are arranged. Thus, some embodiments allow transaction details and payment information to be arranged together or separately, and may occur before, during, or after a call between two parties.

In some implementations, a payor may pre-select one specific payment mechanism for all transactions, may select specific mechanisms to use for particular merchants or types of transactions, or may otherwise pre-determine which mechanisms are to be offered or used. Thus, in some situations, a payment process or payment information process may proceed directly to activation or implementation of a specified payment mechanism, instead of first requiring a payor to select a mechanism. A payment mechanism selected (or pre-approved) for a particular transaction or type of transaction may also be applied to related services, such as shipping, service charges, guarantees (e.g., regarding service, quality, delivery), etc.

In the embodiments of FIG. 13, after the payor selects a payment mechanism, the payment process or payment information process proceeds normally according to the procedure(s) associated with the mechanism. Thus, the payor may be required to login (to authenticate himself or herself), select a financial account (e.g., credit card, debit card, bank account), provide a password, PIN, CVC (Card Verification Code), or some other security code, etc. If a payment mechanism was pre-selected and/or pre-configured by the payor, some of this information (e.g., which credit card to use, credit card number) may be automatically supplied by the payor's device (e.g., the application that generated and/or displayed window 1310).

The payor may also be prompted for other details, such as billing address, delivery address, telephone number, electronic mail address, and so on, to the extent such information was not already provided and is not pre-programmed or pre-specified and available from his or her device, or is needed to verify the payor's identity.

In embodiments in which the user's/payor's device includes a GPS component or other component that can provide trusted data regarding the device's location, time zone, current time, user status, and/or other factors, additional information may be captured as part of the payment process. For example, the application or service that captures the payment information may report, along with the other information provided by the payor (such as credit card number, PayPal ID), the time and/or location information of the payor's device, a manually entered signature (e.g., traced on a touch-screen component of device 1302), a fingerprint scan (if device 1302 includes a fingerprint sensor), etc. Illustratively, this information may be used by a fraud-detection algorithm of a merchant or payment processor, may be used to verify the payor's identity, and/or may be used for other purposes.

If the payor's device includes a fingerprint sensor or other biometric sensor (e.g., retina scanner, voice analyzer), that component may be activated during or after a transaction conducted by the payor. For example, after the payor initiates a purchase in a brick-and-mortar establishment (i.e., not an online store or marketplace), a request for identity verification may be transmitted to the payor's device while the payor is interacting with a sales agent of the establishment or after such interaction. The identity verification may be performed or managed by a trusted intermediary, by the payor's communication service provider, by the payee, or some other entity. The verification may involve comparing the solicited fingerprint (or other biometric information) with an exemplar associated with the payor's chosen payment mechanism (e.g., a particular credit card or debit card).

Similarly, the payor's biometric sensor may be used to verify his or her identity in association with an on-line purchase. For example, the payor may register his or her biometric data ahead of time, such as by providing an exemplar fingerprint via his or her device (online or at a brick-and-mortar establishment), and that exemplar is saved for comparison with a verification version provided at the time of a transaction or as part of the payment process.

In some embodiments, a payor (a caller or a called party) may conduct a payment process in association with a voice call. In some implementations, for example, the payor's device is caused to visually display (e.g., on a touch-screen display component) representations of one or more payment mechanisms (e.g., as shown in FIG. 13). If this is done during a call, the other party (e.g., an agent or operator representing a merchant or vendor) may direct the payor to select a payment mechanism or means from the displayed options. The payor may select a desired option by touching a corresponding icon, swiping his or her payment card (if the device is equipped with a reader), taking a photo of the payment card, identifying an account for making payment, or taking some other action. The payor may also be prompted to enter a security code (e.g., a CVC, a PIN) and/or details such as expiration date, billing address, shipping address, or electronic mail address, etc.

The other party may acknowledge selection and/or execution of the payment process, or such acknowledgement may be displayed on the device, during or after the call.

Content Sharing in Association with a Telephone Call

In illustrative embodiments, content presented to an operator or user of an electronic device may be personal, professional, commercial, or of some other nature. One party to a call or other type of communication connection established as discussed herein may select content for either or both parties to view or experience (or some or all parties, if there are more than two), or different parties may select content for other parties to view or experience. For example, during a delay in establishing the communication connection, and/or during or after the connection, content displayed only on one party's device may be transmitted to or retrieved by another party's device and displayed for that other party.

Thus, in one illustrative embodiment, one party accesses local or remote content (e.g., by browsing to a source or host of the content), before or during a call involving another party, and then shares that content with the other party. This sharing arrangement may involve content presented on the one party's device (e.g., a first device) being transmitted to the other party's device (e.g., a second device) from the first device (and through a call server or call controller if necessary), may involve the source of the content simultaneously transmitting the content to both the first device and the second device, under control of either or both parties or devices, or may involve identifying the content to the second device and causing that device to access the content.

In some embodiments, a party can annotate, highlight, elide, rearrange, draw upon, navigate, browse, fill in a form, or otherwise change the presentation of content shared with another party. Such changes may be applied only to the other party's interaction with the content, or may also propagate to additional parties (e.g., someone who receives the modified content from the other Party).

In some implementations only the sharing party (e.g., the "one" party above) or the party with whom the content is shared (e.g., the "other" party above) can annotate or modify the presentation; in other implementations, either party can annotate or modify the presentation. Similarly, in some implementations the party with whom content is shared may be able to terminate the presentation of content on their device without requiring the sharing party's consent.

While sharing content, parties may be able to converse verbally and/or textually (e.g., via a chat interface), and/or one or both of them may be provided with video or a still image of the other. These options may be separately configurable by or for each party, or one party may control the options. Video presented pre-ring, in-call, and/or post-call may be two-way or one-way. In particular, each party may view the other party (or parties) or one party may view another party without that other party viewing the one party. In addition, video presented to a party may be live or recorded.

Purposes for sharing content between parties may vary from one implementation or scenario to another, and the nature of their interaction may also vary. For example, the parties may co-browse content that at least one of them wants to explore, with one of them directing navigation at one time, and possibly another party controlling presentation at another time. Thus, one of the parties may guide another through shared content, may demonstrate operation of an application or the device on which content is presented, or may otherwise provide some sort of instruction or guidance, which may be described as "assisted sharing." As another example, one party may operate a camera attached to (or part of) his or her computing or communication device, perhaps to capture an ongoing event or something of interest or concern, and share the resulting images and/or video with another party. The images/video may be recorded or stored before they are shared, or may be shared in real-time or near real-time, as they are captured.

In an illustrative embodiment of assisted sharing, a first party interacts with a second party (e.g., a personal shopper, a salesperson, an agent, a concierge, a recommendation service, an expert or an individual licensed/certified in a particular area of knowledge, a customer service representative) that helps the first party locate something (e.g., information, a product, a service), select from among multiple options (e.g., versions of a product, levels of a service, solutions to a problem), configure a selected option (e.g., color or size of a product, term or breadth of a service, action to take to resolve or ameliorate a problem), and/or make some other decision. In this embodiment, either the first party or the second party may facilitate or control presentation of content at a given time, to navigate their displays to or within a particular website, to annotate their displays, to view different offerings, to configure a selected offering, to display a specific subject of discussion (e.g., an electronic or mechanical device requiring repair or diagnosis, a crime scene or other situation requiring analysis, a medical image or scan), etc.

In-call content during an assisted sharing session may comprise an interleaved sequence of content items contributed or identified by the two parties (or the two parties' devices). For example, the in-call content may include dialog between the parties, alternating selections of images (e.g., to finalize a selection or configuration of something), etc.

In some implementations, this assisted sharing embodiment may commence with a communication connection between the parties, in which case presentation of the content may begin for both parties after they are connected, and may be initiated by either party. As another option, the first party may view some initial content alone, but then activate an application or a control that initiates the assisted sharing, or place a call that reaches the second party and then choose to initiate the assisted sharing. As yet another option, the second party may contact the first party (e.g., with a call, via electronic mail, via message (text or otherwise)) when the second party identifies a product or service with which the first party needs assistance or that is known or believed to be of interest to the first party, and either party may initiate the assisted sharing.

As indicated above, during assisted sharing, or while an assisted sharing session is being initiated or established, a party may select pertinent configuration options, such as which level or type of assistance is desired; whether audio, video, imagery, other media (or corresponding devices, such as a microphone or a camera) are enabled; how the media are configured (e.g., whether video is one-way or bi-directional); whether and when to terminate the session; selection of a payment mechanism (if a payment is required); etc. A delay in establishing an assisted sharing session may be implemented to allow configuration of the session, to allow a party to open content to be shared, to establish a call associated with the session, to transmit the shared content to or toward another party, and/or for some other reason.

In addition to pre-call identification of content to be shared (e.g., for assisted sharing), during the call a party may identify further content to be shared, by navigating the display of shared content or by selecting other (e.g., local) content to be shared with the other party or parties. Further, any party may identify content to be displayed to another party after the call is terminated. Content shared among parties may reside on some or all of the parties' devices prior to it being shared, and/or may be delivered to a given party's device at any time (or to a location from which it is directly or indirectly accessible to that device), including before, during, and after a communication connection between the parties.

In an illustrative implementation of assisted sharing, a first party may seek assistance with locating, configuring, or obtaining a desired product or service, and may share some initial content (e.g., a web page, an electronic mail message, a text message, a picture, a video, a hyperlink) with some type of shopping assistant able to assist someone in making a purchase. Subsequently, the assistant may control (e.g., select, navigate, annotate) some or all content presented to the first party, by following links in the initial content, by navigating to another web page or website, etc.

The assistant may also, however, select additional content to be presented to the first party during or after the call, such as content depicting other purchase options, accessories, details of a purchase, payment options, etc. Thus, assisted sharing may be implemented to help a person make a purchase, and content shared between the parties or selected by one party for presentation to the other, may encompass any related content, from any relevant source.

In another illustrative embodiment of assisted sharing, one or more applications on a communication device may be enhanced with controls for initiating an assisted sharing session with an assistant. The assistance that will be provided may relate to use or operation of the corresponding application, may relate to navigation of content via the application, may facilitate purchase or subscription to the application or a related service, may diagnose or solve a problem related to the application or content accessible via the application, or may be of some other nature.

Depending on the application, a control for initiating assisted sharing of content may be preconfigured to establish a communication connection with a representative of the application (or the organization that provides or supports the application), with an agent of a call center (e.g., a call center that provides agents supporting multiple applications), or with some other representative, and may cause the assisted sharing to begin immediately when the representative is connected, or sometime after the connection is established.

Real-Time Call Control and Agent Selection

In some embodiments, a system, method, and apparatus for presenting content in association with a communication connection (e.g., a telephone call) provide for real-time control of the connection, via dynamic call routing for example. In these embodiments, the voice and control/signaling channels of a telephone call are separated, such that the voice channel may continue to be handled by the appropriate telephone carrier, but the routing of the call is handled by an entity external to the carrier's network, such as a call processor, a call server, or a call controller described herein, or an entity that operates a call processor, a call server, or a call controller.

As used herein, the term "real-time" indicates that control of the communication connection is exercised as the connection is formed (e.g., to select and apply desired routing). In particular, the system or apparatus responds to discrete events (e.g., initiation of the communication connection, receipt of signaling from a telecommunication carrier's network) as they occur or with close temporal proximity (e.g., within milliseconds). Near real-time (or "near-time") control of a communication connection may also (or instead) be exercised, in which actions or responses may be slightly delayed, without exceeding the scope of embodiments described herein.

The voice channel of a real-time controlled telephone call may be routed to an agent, operator, or other representative of a called party (e.g., via POTS or Plain Old Telephone System, via VoIP or Voice over Internet Protocol), who may be selected based on information associated with the call (e.g., caller ID), the caller, and/or available representatives, such as (but not limited to) their locations and/or local times. The representative's handling of the call may be aided by making useful information available to the representative via a computing device operated by the representative (e.g., information about the caller, information about a good or service desired by the caller).

U.S. Pat. No. 7,418,092 (the '092 patent), entitled Virtual Call Center, describes how real-time call control may operate in some implementations, and is incorporated herein by reference.

Figure 14:
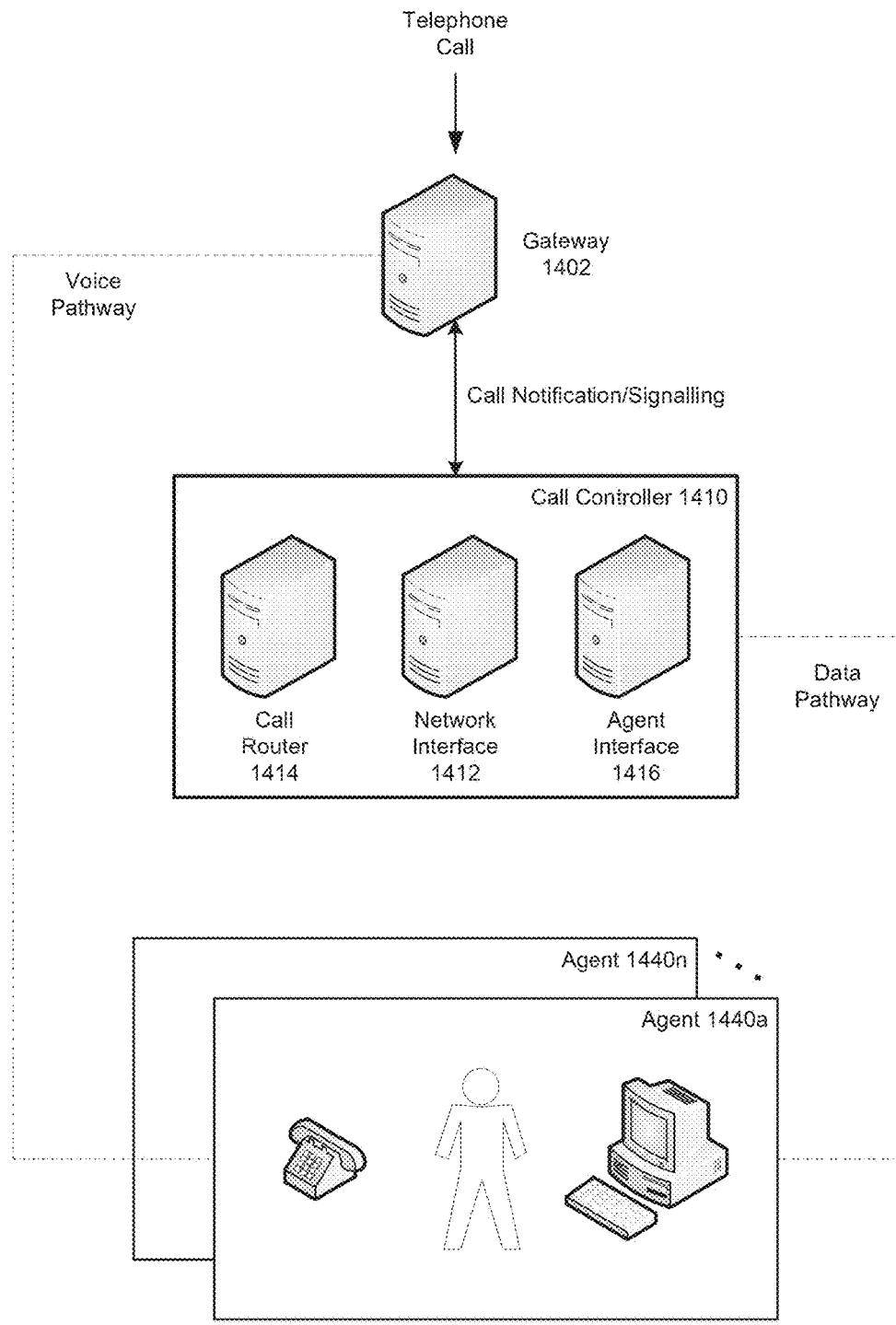
FIG. 14 depicts control of a telephone call in real-time or near real-time, according to some embodiments.

FIG. 14 illustrates an environment in which content can be presented to a caller and/or a called party in association with a call controlled in real-time, according to some embodiments. In some implementations, this environment may be considered a virtual call center (or, alternatively, a virtual contact center) because it may support routing/control of calls to representatives of any number of called parties, and the representatives need not be co-located with the call center communication equipment.

In the illustrated environment, communication gateway 1402 receives telephone calls from callers after they are routed through a Local Exchange Carrier (LEC) or other entity or entities. The call may be conveyed via the PSTN (Public Switched Telephone Network), via VoIP (Voice over Internet Protocol), or some other communication technology. Gateway 1402 notifies call controller 1410 of a new call, and routes a signal/control channel of the call to the call controller 1410, which instructs the gateway where to terminate the voice channel of the call (e.g., a selected agent 1440, such as agent 1440a). Gateway 1402 may include components for receiving the call, routing or terminating the voice channel, notifying the call controller, and/or taking other action; alternatively, it may operate in a cooperative manner with such entities to perform the functions described herein. In some embodiments, call controller 1410 (or a system that includes the call controller) comprises gateway 1402.

Call controller 1410 includes network interface 1412 for receiving notification of a call (from gateway 1402) and identifying to the gateway a destination or termination point for the call's voice channel (e.g., a selected agent's communication device). Call router 1414 executes routing logic to select the destination, which may include identifying available agents, identifying the caller, matching attributes/characteristics of the caller and available agents (e.g., language, age, gender, goods/services desired by the caller, goods/services with which the agents are familiar), determining a (likely) purpose of the call, and/or other action.

Agent interface 1416 of call controller 1410 establishes a data connection with a computing device operated by the selected agent. The data connection may be used to provide the agent with information about the caller (e.g., name, preferences, past orders, physical or mailing address, electronic mail address, telephone number), and may also be used by the agent to retrieve information for use during his or her communication with the caller (e.g., to obtain product information, to place an order), via call controller 1410 and/or other sources (e.g., via the Internet, not shown in FIG. 14).

Each agent 1440 is associated with a communication device (e.g. a telephone), which may receive calls routed from gateway 1402 via the PSTN and/or VoIP, and which allows the agent to converse with callers, and a computing device for supporting the agent's interaction with a caller. Although embodiments are described as implemented to receive calls, in other embodiments, an agent may place a call to a private individual, thereby establishing the communication connection in the reverse manner.

Figure 15:
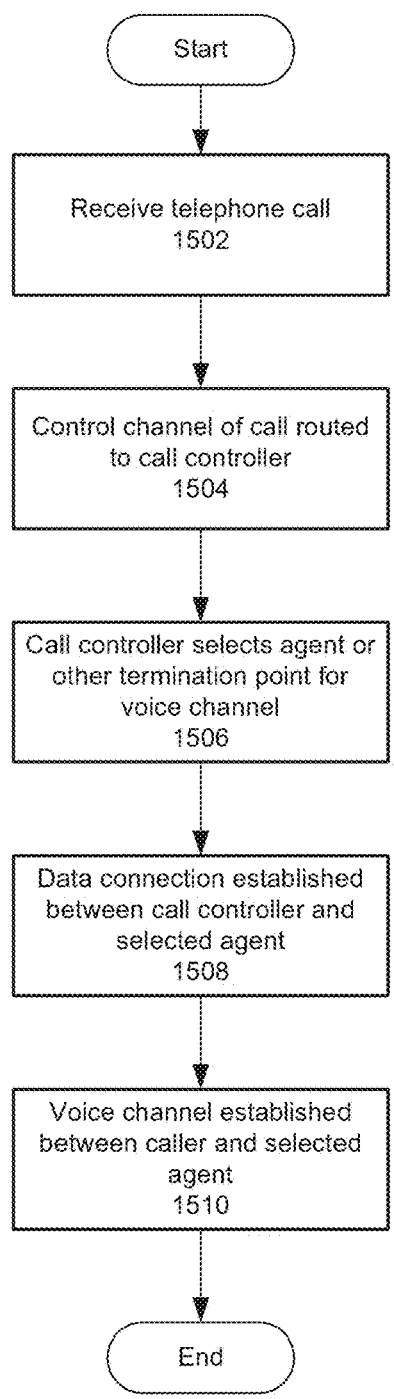
FIG. 15 is a flow chart demonstrating a method of performing real-time call control, with selection of a suitable agent, according to some embodiments.

FIG. 15 is a flow chart demonstrating a method of presenting relevant content to a caller in association with a call, with real-time call control, according to some embodiments. In other embodiments, one or more of the illustrated operations may be omitted, repeated, and/or performed in a different order. Accordingly, the specific arrangement of steps shown in FIG. 15 should not be construed as limiting the scope of the embodiments.

In the illustrated embodiments, a virtual call center, call server, call controller, or comparable entity is configured to receive telephone calls (and possibly to initiate calls), determine a suitable termination point for a voice portion of an incoming call (e.g., a particular agent, representative, or operator), route the voice channel accordingly, and facilitate presentation of content to any or all parties to the call, pre-ring/pre-call, in-call, and/or post-call.

In operation 1502, a telephone call is received at a switch, gateway, interface, or other entity. In operation 1504, a control or signaling portion of the call is routed to a call controller or other entity capable of determining a destination for the voice portion of the call.

In operation 1506, the call controller (or other entity) identifies a termination point for the voice channel, which may be a communication device (e.g., a telephone) associated with a particular agent, as shown in FIG. 14. In different implementations, the destination agent may be selected in different ways or based on different information.

For example, if the caller is unknown (e.g., the caller's telephone number is unknown), the voice channel may be routed to any available agent or the next available agent. A language spoken by the caller may be assumed (e.g., based on the location/area code/country code of the caller's telephone number, and a compatible agent selected. If the caller is known (e.g., the calling telephone number is associated with a known user or customer), the voice channel may be routed to an agent likely to conduct a successful or friendly discussion with the caller.

In the latter case, when selecting a suitable agent the call controller may consider factors such as the caller's geographical area (e.g., based on the area code of his or her telephone number), language, sex, age (or age range), purchase history (with the called party and/or other vendors), frequency of communication with the called party, and/or other caller characteristics, as well as (or instead of) attributes of agents with whom the caller has interacted successfully or productively, a recent (e.g., the most recent) transaction between the caller and the called party, an account status of the caller, etc. The call controller may also consider factors concerning the agent, such as the agent's known language(s), gender, age, experience, rating, availability, success rate (e.g., how successful he or she is with telephone customers), location (e.g., local, remote), cost (e.g., salary, commission), and/or other agent characteristics, the time of day, the quality of communication channels to the agent, the cost of routing the call to the agent, etc.

In operation 1508, a data connection is established between the agent and the call controller or a cooperating component (e.g., an agent interface of a call server). An initial portion of data may be provided via this data connection, which may notify the agent of the call, identify the caller (e.g., by name, by telephone number, by account number), provide a status of the caller's account or a recent order placed by the caller (for a good or service), and/or other information.

In some implementations, the caller may be included in at least part of the data connection. If the caller is calling from a smart phone, for example, or is using VoIP from his or her computer, data communications may be conducted with the caller's device to share content (e.g., multimedia content) between the caller and agent, display product/service options to the caller, receive custom data from the caller (e.g., to personalize a product), etc.

In operation 1510, the voice channel is connected to the specified destination. This may cause a telephone or other communication device of a selected agent or representative to ring. When the caller and/or the agent eventually hang-up or otherwise terminate the communication connection, the voice and data connections are disconnected and the method ends.

As described in previous sections, selected content may be presented to the caller and/or the agent/representative (and/or other parties to the call, if any) before, during, and/or after the call. Thus, before the call is answered by the selected agent, the caller may be offered content related to an account held by the caller with the called party (e.g., an order status, an account balance), descriptions of available goods and services, the status of the call (e.g., how soon it is expected to be answered), etc. As indicated above, the agent may be provided content related to the caller, a previous transaction involving the caller, a script or guide for handling the call, etc.

During the call, either or both parties may be provided content related to their discussion, such as product/service descriptions and options, payment mechanisms, and so on. The agent, for example, may select content to be presented to the caller in order to inform him or her of available product configurations (e.g., size, color), to show examples of the result of services the caller may purchase, etc.

After the call, the caller may receive a summary, transcript, or other record of the discussion, a receipt for a purchase made during the call, and/or other content, while the agent may receive (and/or manipulate) data related to the transaction with the caller.

To facilitate delivery of pre-ring content to parties via a communication connection (e.g., caller, agent), and/or for other purposes (e.g., to select a suitable agent), a telephone call may be delayed as described previously (e.g., by signaling or instructing a caller's device to delay dialing the call) and/or by delaying the call after it is received at a gateway (e.g., gateway 1402 of FIG. 4). Thus, after a call is received at the gateway, and while a call controller or other entity is being notified of the call and is selecting or identifying a termination point for (the voice channel of) the call, the call may be held or delayed by the gateway.

Data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments have been presented for purposes of illustration and description only. They are not intended to be exhaustive or limiting. Accordingly, many modifications and variations will be apparent to practitioners skilled in the art. The scope of the invention is defined by the appended claims, not the preceding disclosure.

What is claimed is:

1. A method of facilitating presentation of content on a communication device, the method comprising:
   receiving notification of a call from a first communication device;
   in response to the notification:
      delaying routing of the call without soliciting action by a first operator of the first communication device; and
      selecting a second operator of a second communication device to receive the call;
   separating the call into a signaling channel and a voice channel; and
   connecting the voice channel of the call to the second communication device after termination of the delay.

2. The method of claim 1, further comprising, in response to the notification:
   causing to be transmitted, to one or more of the first communication device and the second communication device, pre-ring content delivered before the call rings at the second communication device.

3. The method of claim 1, wherein:
   the notification comprises a notification of initiation of the call; and
   delaying routing of the call comprises transmitting a signal to the first communication device to delay dialing the call.

4. The method of claim 1, wherein:
   the notification comprises a notification of receipt of the call at a gateway; and
   delaying routing of the call comprises delaying connection of the voice channel of the call from the gateway to the second communication device.

5. The method of claim 1, wherein receiving the notification comprises receiving the signaling channel.

6. The method of claim 1, further comprising, prior to receiving the notification:
   receiving the call, at a gateway, from a public switched telephone network;
   wherein receiving the notification comprises receiving the notification at a call controller, from the gateway; and
   wherein the call controller selects the second operator.

7. The method of claim 6, wherein connecting the call comprises:
   signaling the gateway, by the call controller, to direct the voice channel of the call to the second communication device.

8. The method of claim 1, further comprising:
   after connecting the call to the second communication device, causing to be transmitted, to one or more of the first communication device and the second communication device, in-call content delivered during the call.

9. The method of claim 8, wherein the in-call content comprises content displayed simultaneously, during the call, on the first communication device and the second communication device.

10. The method of claim 8, wherein the in-call content comprises a first sequence of content items from the first communication device interleaved with a second sequence of content items from the second communication device.

11. The method of claim 1, further comprising:
   causing to be transmitted, to one or more of the first communication device and the second communication device, post-call content delivered after the call is terminated.

12. The method of claim 11, wherein said causing to be transmitted comprises transmitting a reference to the post-call content to the one or more of the first communication device and the second communication device.

13. A non-transitory computer-readable medium storing instructions that, when executed by a processor, cause the processor to perform a method of facilitating presentation of content on a communication device, the method comprising:
   receiving notification of a call from a first communication device;
   in response to the notification:
      delaying routing of the call without soliciting action by a first operator of the first communication device; and
      selecting a second operator of a second communication device to receive the call;
   separating the call into a signaling channel and a voice channel; and
   connecting the voice channel of the call to the second communication device after termination of the delay.

14. An apparatus for facilitating presentation of content on a communication device, the apparatus comprising:
one or more processors; and
memory storing instructions that, when executed by the one or more processors, cause the apparatus to:
receive notification of a call from a first communication device;
in response to the notification:
delay routing of the call without soliciting action by a first operator of the first communication device; and
select a second operator of a second communication device to receive the call;
separate the call into a signaling channel and a voice channel; and
connect the voice channel of the call to the second communication device after termination of the delay.

15. The apparatus of claim 14, wherein the memory further stores instructions that, when executed by the one or more processors, cause the apparatus to, in response to the notification:
cause to be transmitted, to one or more of the first communication device and the second communication device, pre-ring content delivered before the call rings at the second communication device.

16. The apparatus of claim 14, wherein:
the notification comprises a notification of initiation of the call; and
delaying routing of the call comprises transmitting a signal to the first communication device to delay dialing the call.

17. The apparatus of claim 14, wherein:
the notification comprises a notification of receipt of the call at a gateway; and
delaying routing of the call comprises delaying connection of the voice channel call from the gateway to the second communication device.

18. The apparatus of claim 14, wherein receiving the notification comprises receiving the signaling channel.

19. The apparatus of claim 14, wherein the memory further stores instructions that, when executed by the one or more processors, cause the apparatus to, prior to receiving the notification:
receive the call, at a gateway, from a public switched telephone network;
wherein receiving the notification comprises receiving the notification at a call controller, from the gateway; and
wherein the call controller selects the second operator.

20. The apparatus of claim 19, wherein connecting the call comprises:
signaling the gateway, by the call controller, to direct the voice channel of the call to the second communication device.

21. The apparatus of claim 14, wherein the memory further stores instructions that, when executed by the one or more processors, cause the apparatus to:
after connecting the call to the second communication device, cause to be transmitted, to one or more of the first communication device and the second communication device, in-call content delivered during the call.

22. The apparatus of claim 21, wherein the in-call content comprises content displayed simultaneously, during the call, on the first communication device and the second communication device.

23. The apparatus of claim 14, wherein the memory further stores instructions that, when executed by the one or more processors, cause the apparatus to, further comprising:
causing to be transmitted, to one or more of the first communication device and the second communication device, post-call content delivered after the call is terminated.

* * * * *